(12) United States Patent
Nakanishi et al.

(10) Patent No.: US 7,040,760 B2
(45) Date of Patent: May 9, 2006

(54) LIQUID CRYSTAL PROJECTOR

(75) Inventors: Shuichi Nakanishi, Tokyo (JP); Atsushi Kato, Tokyo (JP)

(73) Assignee: NEC Viewtechnology, Ltd., Tokyo (JP)

(*) Notice: Subject to any disclaimer, the term of this patent is extended or adjusted under 35 U.S.C. 154(b) by 0 days.

(21) Appl. No.: 10/698,377

(22) Filed: Nov. 3, 2003

(65) Prior Publication Data

US 2004/0090601 A1 May 13, 2004

(30) Foreign Application Priority Data

Nov. 7, 2002 (JP) .............................. 2002-324032
Apr. 16, 2003 (JP) .............................. 2003-112046

(51) Int. Cl.
  G03B 21/14 (2006.01)
  G03B 21/26 (2006.01)
  G02B 27/26 (2006.01)
  F21V 9/14 (2006.01)

(52) U.S. Cl. .............................. 353/20; 353/8; 353/33; 353/37; 353/81; 353/82; 353/99; 348/742; 348/751; 348/757; 359/267; 359/465; 359/495; 359/496; 359/497; 359/929; 349/9; 349/15; 349/25; 362/19; 362/555; 362/231

(58) Field of Classification Search ............. 353/20, 353/30–34, 37, 38, 81, 82, 84, 98, 99, 102, 353/7, 8; 348/739, 742, 750, 751, 756–759, 348/761, 766, 770, 771; 359/237, 247, 267, 359/275, 302, 487, 618, 627, 629, 636, 462, 359/464, 465, 495, 496, 497; 349/9, 15, 349/25; 362/19, 555, 231

See application file for complete search history.

(56) References Cited

U.S. PATENT DOCUMENTS 6,536,902 B1 * 3/2003 Lee .............................. 353/20
6,672,722 B1 * 1/2004 O'Connor et al. ............. 353/34
6,769,772 B1 * 8/2004 Roddy et al. .................. 353/31

FOREIGN PATENT DOCUMENTS

EP  0 922 986 A2 * 6/1999

(Continued)

Primary Examiner—W. B. Perkey
Assistant Examiner—Rochelle Blackman
(74) Attorney, Agent, or Firm—Young & Thompson

(57) ABSTRACT

In order to provide a liquid crystal projector that prevents the image burn-in phenomenon or image sticking in a liquid crystal projector of ferroelectric liquid crystal, and moreover, that provides a bright projected image, the polarization directions of linearly polarized light beams that are irradiated upon a liquid crystal display device are switched in synchronization with the alternate reversal of the polarity of the liquid crystal display device, whereby a negative image, which could not be displayed in the prior art, can be converted to a positive image and displayed. In addition, in order to provide a liquid crystal projector that presents a bright projected image while preventing the burn-in phenomenon in a liquid crystal display device of ferroelectric liquid crystal, and further, that can be used in displaying a stereoscopic image, a P-polarized light beam and an S-polarized light beam are alternately generated, and an S-polarized light beam image light and a P-polarized light beam image light are produced from two liquid crystal display devices and alternately projected. When displaying a stereoscopic image, the left-eye image light of the S-polarized light beam and the right-eye image light of the P-polarized light beam are alternately produced and alternately projected.

35 Claims, 21 Drawing Sheets

FOREIGN PATENT DOCUMENTS

| | | |
|---|---|---|
| JP | 5-257110 | 10/1993 |
| JP | 6-289387 | 10/1994 |
| JP | 7-140415 | 6/1995 |
| JP | 9-138371 | 5/1997 |
| JP | 11-281931 | 10/1999 |
| JP | 11-331879 | 11/1999 |
| JP | 2999952 | 11/1999 |
| JP | 2001-174775 | 6/2001 |
| JP | 2002-244211 | 8/2002 |

* cited by examiner

LIQUID CRYSTAL PROJECTOR

BACKGROUND OF THE INVENTION

1. Field of the Invention

The present invention relates to a liquid crystal projector for displaying an image using a liquid crystal display device as a spatial light modulation device.

2. Description of the Related Art

TN (Twisted Nematic) liquid crystal and ferroelectric liquid crystal are well known as liquid crystals used in display devices. Although TN liquid crystal display devices and ferroelectric liquid crystal display devices are both constructed such that the polarization properties of these devices can be used to control reflectivity (or transmittance), the operation of these two types of display devices is different.

While continuous control of reflectivity (or transmittance) is possible in a TN liquid crystal, reflectivity (or transmittance) can only be controlled discretely in two states (ON and OFF) in a ferroelectric liquid crystal. Thus, in the case of a ferroelectric liquid crystal, gray-scale display is realized by pulse width modulation (PWM). In other words, gray scale can be represented by controlling the time ratio of the ON and OFF states.

When the same screen is displayed on a liquid crystal display device over a long period of time, this screen will remain even after switching to another pattern, i.e., the phenomenon known as image burn-in or image sticking occurs. This phenomenon is thought to occur because, when an electric field of the same orientation acts on liquid crystal cells over a long period of time, ions of impurities that are contained in the liquid crystals are displaced toward the interface, and the electric field that is produced by these displaced ions of impurities then interferes with the movement of the liquid crystal.

In order to prevent image burn-in, control is effected in the liquid crystal display device such that the average electric field that is applied to the liquid crystal cells over a particular time period is zero. In other words, the display of one image must be followed by the application of the opposite electric field.

Since the states of polarized light are controlled by the absolute value of the electric field in a TN liquid crystal and are not related to polarity, the positive (normal gray-scale) image is displayed even if the polarity of the electric field is reversed. In the case of a ferroelectric liquid crystal, on the other hand, the states of polarized light are controlled by the polarity of the electric field, and reversing the polarity of the electric field causes a negative (inverted gray-scale) image to be displayed. The prior art is next explained with reference to the following patent documents:

Patent Document 1:
Japanese Patent Laid-Open Publication No. 2002-244211

Patent Document 2:
Japanese Patent Laid-Open Publication No. 2001-174775

Patent Document 3:
Japanese Patent Laid-Open Publication No. H11-331879

Patent Document 4:
Japanese Patent No. 2999952
(Japanese Patent Laid-Open Publication No. H9-138371)

Patent Document 5:
Japanese Patent Laid-Open Publication No. H11-281931

Patent Document 6:
Japanese Patent Laid-Open Publication No. H5-257110

Explanation first regards the first example of a liquid crystal projector of the prior art with reference to FIGS. 1, 2, and 3. FIG. 1 is a structural view showing the optical configuration of the first example of a liquid crystal projector of the prior art. Patent Document 1, for example, discloses an image projection device that employs polarized light conversion elements. The optical configuration of the first example of a liquid crystal projector of the prior art is described with reference to FIG. 1. The first example of the liquid crystal projector of the prior art is of a construction that employs one liquid crystal display device.

Red, green, and blue linearly polarized light beams are irradiated from red linearly polarized light source C11R, green linearly polarized light source C11G, and blue linearly polarized light source C11B, respectively. The paths of these linearly polarized light beams are unified by color synthesizing optics C13. The linearly polarized light beams that are transmitted by color synthesizing optics C13 are shaped by luminous flux shaping optics C12, and irradiated into liquid crystal display device C2.

Liquid crystal display device C2 spatially modulates the polarized state of the incident light and directs the modulated light into polarizing filter C3. Of the incident light, polarizing filter C3 transmits only light for which the polarization direction coincides with the axis of transmission. Light that has been transmitted by polarizing filter C3 passes through projection optics C4 and is projected as image light onto a screen (not shown in the figure).

FIG. 2 is a structural view showing the optical configuration of the linearly polarized light source that is shown in FIG. 1. Non-polarized light that is emitted by light-emitting element C111 is split into a P-polarized light beam and an S-polarized light beam by polarization beam splitter C1121. The optical path of this S-polarized light beam is deflected and made parallel to the P-polarized light beam by mirror C1122. The direction of polarization of the P-polarized light beam that is emitted from polarization beam splitter C1121 is rotated 90 degrees by half-wave plate C1123, its direction of polarization thereby being made the same as that of the S-polarized light beam that is emitted from polarization beam splitter C1121. In other words, the non-polarized light beam that is irradiated from light-emitting element C111 is converted to an S-polarized light beam by polarization conversion element array C112.

The control of the liquid crystal projector that is shown in FIG. 1 is next explained with reference to FIG. 3. FIG. 3 is a timing chart showing the states of control of the first example of the liquid crystal projector of the prior art that is shown in FIG. 1.

In FIG. 3, R-S polarized light indicates that the light is red and S-polarized light, G-S polarized light indicates that the light is green and S-polarized light, and B-S polarized light indicates that the light is blue and S-polarized light. In addition, R-Pos indicates a positive red image, R-Neg indicates a negative red image, G-Pos indicates a positive green image, G-Neg indicates a negative green image, B-Pos indicates a positive blue image, B-Neg indicates a negative blue image, and OFF indicates the absence of light.

Liquid crystal display device C2 is controlled so as to display images having the characteristics of R-Pos, G-Pos, B-Pos, R-Neg, G-Neg, and B-Neg in accordance with the video signals. Light beams are successively emitted from illumination system C1 in synchronization with these images, these light beams having the characteristics R-S polarized light, G-S polarized light, B-S polarized light, OFF, OFF, and OFF. Accordingly, polarizing filter C3 emits only positive image light that is displayed by liquid crystal display device C2 and does not emit light during the interval in which a negative image is displayed.

The above-described construction makes the average electric field that is applied to the liquid crystal zero in a ferroelectric liquid crystal display device and thus can prevent the burn-in phenomenon.

In the first example of a liquid crystal projector of the ferroelectric liquid crystal type such as is shown in FIG. 1, an image is not displayed for half of the interval as shown in FIG. 3, and this form therefore has the problem that the brightness of the projected image is sacrificed to prevent the burn-in phenomenon.

Explanation next regards the second example of a liquid crystal projector of the prior art with reference to FIGS. 4 and 5. FIG. 4 is a structural view showing the optical configuration of the second example of the liquid crystal projector of the prior art. This second example of a liquid crystal projector of the prior art is a construction that employs two liquid crystal display devices. A prior-art example that uses two liquid crystal display devices is disclosed in, for example, Patent Document 2.

The optical configuration of the liquid crystal projector of the prior art is first explained with reference to FIG. 4. White light that is emitted from white light source 111 is successively converted to red light, green light, and blue light by means of color switching means 112. The light is further transmitted or blocked by means of shutter 113.

Polarization beam splitter 102 is an optical element that allows rectilinear propagation of the P-polarized light beam but that deflects the optical path of the S-polarized light beam by 90 degrees. The non-polarized light that is emitted from illumination means 101 is resolved by polarization beam splitter 102 into a P-polarized light beam and an S-polarized light beam, and these light beams are directed to reflective liquid crystal display devices 103 and 104, respectively.

Reflective liquid crystal display device 103 receives the P-polarized light beam that has been transmitted by polarization beam splitter 102 and emits a P-polarized light beam and an S-polarized light beam at a proportion that is controlled in accordance with video signals. Of the light that is emitted by reflective liquid crystal display device 103, the P-polarized light beam is propagated directly through polarization beam splitter 102 without being directed toward projection optics 105 while the S-polarized light beam is deflected by polarization beam splitter 102 and directed toward projection optics 105.

Reflective liquid crystal display device 104 receives the S-polarized light beam that has been transmitted by polarization beam splitter 102 and emits a P-polarized light beam and an S-polarized light beam at a proportion that is controlled in accordance with video signals. Of the light that is emitted by reflective liquid crystal display device 104, the P-polarized light beam is propagated directly through polarization beam splitter 102 and is directed toward projection optics 105, and the S-polarized light beam is deflected by polarization beam splitter 102 and is not directed toward projection optics 105.

The light that is transmitted by polarization beam splitter 102 and reaches projection optics 105 is projected as image light upon a screen (not shown in the figure).

Referring now to FIGS. 4 and 5, the control of the liquid crystal projector that is shown in FIG. 4 is next explained. FIG. 5 is a timing chart showing the states of control when using a ferroelectric liquid crystal display device in the liquid crystal projector shown in FIG. 4.

In FIG. 5, R indicates red light, G indicates green light, B indicates blue light, and OFF indicates that there is no light. In addition, R-P polarized light indicates red P-polarized light, R-S polarized light indicates red S-polarized light, G-P polarized light indicates green P-polarized light, G-S polarized light indicates green S-polarized light, B-P polarized light indicates blue P-polarized light, and B-S polarized light indicates blue S-polarized light. Further, R-Pos indicates the display of a positive red image, R-Neg indicates the display of a negative red image, G-Pos indicates the display of a positive green image, G-Neg indicates the display of a negative green image, B-Pos indicates the display of a positive blue image, and B-Neg indicates the display of a negative blue image.

Light beams having the characteristics R (red light), OFF (no light), G (green light), OFF (no light), B (blue light), and OFF (no light) are successively emitted from illumination means 101. Illumination means 101 and reflective liquid crystal display devices 103 and 104 are controlled in synchronization with video signals.

During the intervals in which light is emitted from illumination means 101, reflective liquid crystal display devices 103 and 104 are controlled so as to display positive images in accordance with video signals. In addition, during the interval in which light is not emitted from illumination means 101, reflective liquid crystal display devices 103 and 104 are controlled so as to display negative images in accordance with video signals. Projection optics 105 therefore emits only the positive image light that is displayed by reflective liquid crystal display devices 103 and 104 and does not emit light during the intervals in which negative images are displayed.

The above-described construction makes the average electric field that is applied to the liquid crystal zero in a ferroelectric liquid crystal display device and thus can prevent the uneven distribution of ions and prevent the burn-in phenomenon. Thus, the second example of a liquid crystal projector of ferroelectric liquid crystal of the prior art as shown in FIG. 4 also has the problem that, as with the first example, an image is not displayed during half of the intervals, as shown in FIG. 5, and the brightness of the projected image is therefore sacrificed to prevent the burn-in phenomenon.

The display of a stereoscopic image is one application of a liquid crystal projector. Several methods are used for stereoscopic display.

A stereoscopic image projector and an apparatus for stereoscopic viewing of an image, this projector and apparatus being the invention of Patent Document 3, disclose a method of stereoscopic display by projecting a left-eye image and a right-eye image, which are linearly polarized light beams directed in the same direction, and glasses that include a liquid crystal shutter that acts to alternately block the right-eye line of sight and the left-eye line of sight.

In addition, a stereoscopic image display device that uses polarization glasses, this device being the invention of Patent Document 4, discloses a method for stereoscopic display that is realized by alternately projecting a left-eye image and a right-eye image, these images being linearly polarized light that is polarized in different directions, and by restricting the optical paths by means of polarization glasses.

In addition, the projector that is the invention described in Patent Document 5 and the projector-type liquid crystal display device that is the invention described in Patent Document 6 both disclose a method for stereoscopic display that is realized by limiting optical paths by means of polarization glasses and by projecting a left-eye image in combination with a right-eye image, these images being linearly polarized light that is polarized in different directions.

In the liquid crystal projectors that are applied in these stereoscopic image displays, the display device may employ a TN liquid crystal or a ferroelectric liquid crystal.

SUMMARY OF THE INVENTION

The present invention was realized in view of the above-described problems and has as its object the provision of a liquid crystal projector that features a brighter projected image while preventing the burn-in phenomenon in a ferroelectric liquid crystal liquid crystal projector. The present invention also has as an object the provision of a liquid crystal projector that enables the display of a stereoscopic image through the combined use of polarization glasses and liquid crystal shutter glasses.

In order to achieve the above-described objects, the liquid crystal projector of the first embodiment of the present invention includes: an illumination system for alternately emitting a first linearly polarized light beam and a second linearly polarized light beam having directions of polarization that differ by 90 degrees; a liquid crystal display device for modulating light beams from the illumination system; a polarizing filter for filtering a specific polarization component of the light beams from the liquid crystal display device; and projection optics for projecting the light from the polarizing filter.

The liquid crystal projector of the first embodiment of the present invention includes: illumination system for alternately emitting a first linearly polarized light beam and a second linearly polarized light beam having directions of polarization that differ by 90 degrees; a polarization beam splitter for receiving the first linearly polarized light beam and the second linearly polarized light beam from the illumination system and splitting the beams in different directions; a first reflective liquid crystal display device for modulating the first linearly polarized light beam that has been split by the polarization beam splitter; a second reflective liquid crystal display device for modulating the second linearly polarized light beam that has been split by the polarization beam splitter; and projection optics; wherein the polarization beam splitter combines the light beam that has been modulated by the first reflective liquid crystal display device and the light beam that has been modulated by the second reflective liquid crystal display device; and the projection optics projects the light beams that have been combined by the polarization beam splitter.

The liquid crystal display device may be transmissive or reflective.

The liquid crystal display device may be constructed using a ferroelectric liquid crystal material.

The first reflective liquid crystal display device and the second reflective liquid crystal display device may be constructed using a ferroelectric liquid crystal material.

The illumination system may include a light-emitting element array made up of a plurality of light-emitting elements, and a polarization conversion element array; wherein the polarization conversion element array may receive the light that is generated from a portion of the light-emitting elements of the light-emitting element array and emits the first linearly polarized light beam, and receives the light that is generated from the remaining light-emitting elements of the light-emitting element array and emits the second linearly polarized light beam.

The illumination system may include a plurality of combinations of light-emitting element arrays and polarization conversion element arrays.

One or a plurality of light-emitting element arrays may include red light-emitting elements, green light-emitting elements, and blue light-emitting elements.

The illumination system may include: a light source, an emitted optical path switching means for alternately emitting light from the light source in two directions, a first polarization unifying means for converting light that is emitted in a first direction by the emitted optical path switching means to linearly polarized light, a second polarization unifying means for converting light that is emitted in a second direction by the emitted optical path switching means to linearly polarized light, and synthesizing optics for combining the optical paths of the light from the first polarization unifying means and the light from the second polarization unifying means; wherein the direction of polarization of the polarized light that is emitted from the first polarization unifying means and the direction of polarization of the polarized light that is emitted from the second polarization unifying means may form an angle of 90 degrees.

In addition, the light source may switch between emitting red light, green light, and blue light.

The emitted optical path switching means may include a movable mirror for switching the direction in which the received light is emitted.

The synthesizing optics may include a polarized light beam combiner for combining the first linearly polarized light beam and the second linearly polarized light beam.

The synthesizing optics may include a plurality of fixed mirrors and a movable mirror for switching received light.

The illumination system may include: a light source, an emitted optical path switching means for alternately emitting light beams from the light source in two directions, a first polarization unifying means for converting light that is emitted in a first direction by the [emitted] optical path switching means to linearly polarized light, a second polarization unifying means for converting light that is emitted in a second direction by the [emitted] optical path switching means to linearly polarized light, and synthesizing optics for combining the optical paths of light from the first polarization unifying means and light from the second polarization unifying means; wherein the emitted optical path switching means may include a movable mirror for switching the direction in which received light is emitted; the synthesizing optics may include a plurality of fixed mirrors and a movable mirror for switching received light; a single movable mirror may serve as both the movable mirror of the emitted optical path switching means and the movable mirror of the synthesizing optics; and the direction of polarization of the polarized light that is emitted from the first polarization unifying means and the direction of polarization of the polarized light that is emitted from the second polarization unifying means may form an angle of 90 degrees.

In addition, the first reflective liquid crystal display device may be controlled by left-eye video signals, and the second reflective liquid crystal display device may be controlled by right-eye video signals.

According to the first embodiment of the present invention, the liquid crystal projector of the present invention exhibits the following effects.

A liquid crystal projector of the present invention that employs ferroelectric liquid crystal is capable of preventing the burn-in phenomenon without sacrificing the brightness of the projected image. This effect is realized because the liquid crystal display device is controlled so as to alternately display a positive image and a negative image. Thus, not only is the average electric field that is applied to the liquid crystal made zero and the burn-in phenomenon prevented, but at the same time, the switching of the polarization direction of linearly polarized light that illuminates the liquid crystal display device allows the negative image, which could not be displayed in the prior art, to be converted to a positive image and displayed.

To realize the above-described object, the liquid crystal projector according to the second embodiment of the present invention includes: a polarization beam splitter for splitting the received P-polarized light beam and S-polarized light beam into different directions, illumination means for alternately directing a P-polarized light beam and an S-polarized light beam to the polarization beam splitter, a first reflective liquid crystal display device for modulating the P-polarized light that has been split by the polarization beam splitter, a second reflective liquid crystal display device for modulating the S-polarized light that has been split by the polarization beam splitter, and projection optics; wherein the polarization beam splitter combines the light beam that has been modulated by the first reflective liquid crystal display device and the light beam that has been modulated by the second reflective liquid crystal display device; and the projection optics projects the light beams that have been combined by the polarization beam splitter.

In addition, the first reflective liquid crystal display device and the second reflective liquid crystal display device may be constructed using a ferroelectric liquid crystal material.

Further, the illumination means may include: a light source, an emitted optical path switching means for alternately emitting light beams from the light source in two directions, a first polarization unifying means for converting light that is emitted in a first direction by the emitted optical path switching means to linearly polarized light, a second polarization unifying means for converting light that is emitted in a second direction by the emitted optical path switching means to linearly polarized light, and synthesizing optics for combining the optical paths of light from the first polarization unifying means and the light from the second polarization unifying means; wherein the direction of oscillation of the electric field of the polarized light that is emitted from the first polarization unifying means and the direction of oscillation of the electric field of the polarized light that is emitted from the second polarization unifying means form an angle of 90 degrees.

The emitted optical path switching means may include a movable mirror for switching the direction in which the received light is emitted.

The synthesizing optics may include a polarized beam combiner for synthesizing a P-polarized light beam and an S-polarized light beam.

In addition, the synthesizing optics may include a plurality of fixed mirrors and a movable mirror for switching the received light.

In addition, the first reflective liquid crystal display device and the second reflective liquid crystal display device may be constructed using a ferroelectric liquid crystal material; the illumination means may include: a light source, an emitted optical path switching means for alternately emitting light beams from the light source in two directions, a first polarization unifying means for converting the light that is emitted in a first direction by the emitted optical path switching means to a linearly polarized light, a second polarization unifying means for converting the light that is emitted in a second direction by the emitted optical path switching means to a linearly polarized light, and synthesizing optics for combining the optical paths of the light from the first polarization unifying means and the light from the second polarization unifying means; wherein the emitted optical path switching means may include a movable mirror for switching the direction in which the received light is emitted; the synthesizing optics may include a plurality of fixed mirrors and a movable mirror for switching the received light; a single movable mirror may serve as both the movable mirror of the emitted optical path switching means and the movable mirror of the synthesizing optics; and the direction of oscillation of the electric field of polarized light that is emitted from the first polarization unifying means and the direction of oscillation of the electric field of the polarized light that is emitted from the second polarization unifying means may form an angle of 90 degrees.

A liquid crystal projector for displaying a stereoscopic image according to the second embodiment of the present invention includes:

a polarization beam splitter for splitting the received P-polarized light beam and the S-polarized light beam into two different directions, an illumination means for alternately directing a P-polarized light beam and an S-polarized light beam to the polarization beam splitter, a first reflective liquid crystal display device for modulating the P-polarized light beam that has been split by the polarization beam splitter, a second reflective liquid crystal display device for modulating the S-polarized light beam that has been split by the polarization beam splitter, and projection optics;

wherein the illumination means may include:

a light source, an emitted optical path switching means for alternately emitting light beams from the light source in two directions, a first polarization unifying means for converting light that is emitted in a first direction by the emitted optical path switching means to linearly polarized light, a second polarization unifying means for converting light that is emitted in a second direction by the emitted optical path switching means to linearly polarized light, and synthesizing optics for combining optical paths of the light from the first polarization unifying means and the light from the second polarization unifying means;

wherein:

a direction of oscillation of an electric field of the polarized light that is emitted from the first polarization unifying means and a direction of oscillation of an electric field of polarized light that is emitted from the second polarization unifying means may form an angle of 90 degrees;

the polarization beam splitter combines the light beam that has been modulated by the first reflective liquid crystal display device and the light beam that has been modulated by the second reflective liquid crystal display device; and the projection optics is a liquid crystal projector that projects the light beams that have been combined by the polarization beam splitter and wherein:

the first reflective liquid crystal display device and the second reflective liquid crystal display device alternately produce a left-eye image and a right-eye image, respectively, and project these images onto a screen; and the images that are projected on the screen are viewed through polarization glasses in which the left-eye polarizing element and the right-eye polarizing element have different directions of polarization.

Stereoscopic display may also be realized by using shutter glasses to view an image that is projected on the screen, wherein the switching of the left-eye and right-eye images that are projected by the liquid crystal projector is synchronized with the left-eye and right-eye shutters of the shutter glasses.

According to the second embodiment of the present invention, the liquid crystal projector of the present invention exhibits the following effects:

As a first effect, the liquid crystal projector of the present invention that employs ferroelectric liquid crystal is capable of preventing the burn-in phenomenon without sacrificing the brightness of a projected image. This effect can be realized because the image light beams from the two liquid crystal display devices are alternately projected, and a negative electric field is applied to the liquid crystal during intervals in which the image light is not projected, whereby the average electric field that is applied to the liquid crystal becomes zero.

As a second effect, the combined use of the liquid crystal projector of the present invention with polarization glasses enables the display of a stereoscopic image. This display is achieved through the use of two liquid crystal display devices to produce image light of S-polarized light for the left eye and image light of P-polarized light for the right eye.

As a third effect, the combined use of the liquid crystal projector of the present invention with shutter glasses enables the display of a stereoscopic image. This display is achieved through the use of two liquid crystal display devices to alternately project image light for the left eye and image light for the right eye.

The above and other objects, features, and advantages of the present invention will become apparent from the following description with reference to the accompanying drawings, which illustrate examples of the present invention.

DETAILED DESCRIPTION OF THE PREFERRED EMBODIMENTS

First Embodiment of the Present Invention

Figure 1:
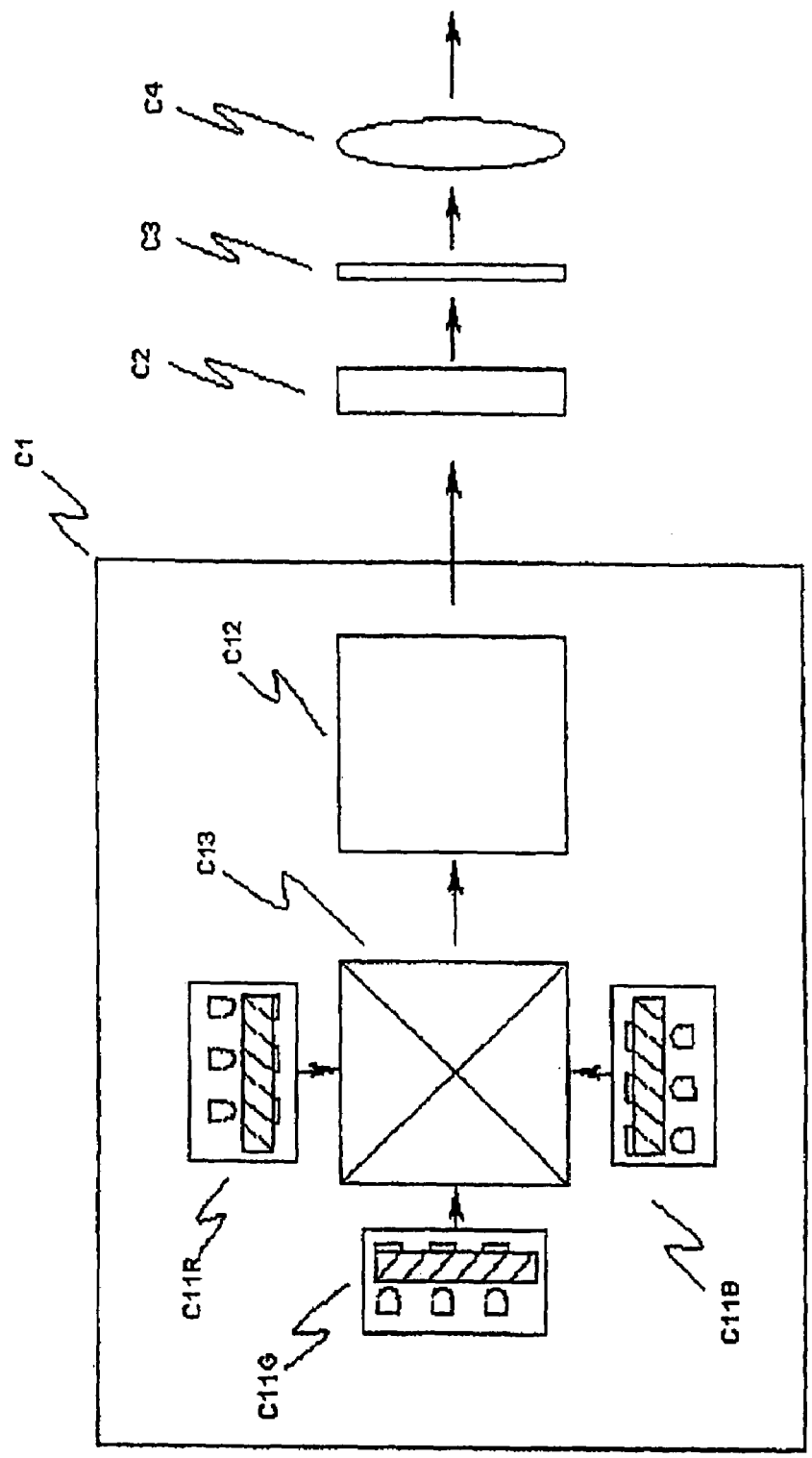
FIG. 1 is a structural view showing the optical configuration of a first example of a liquid crystal projector of the prior art.
Figure 2:
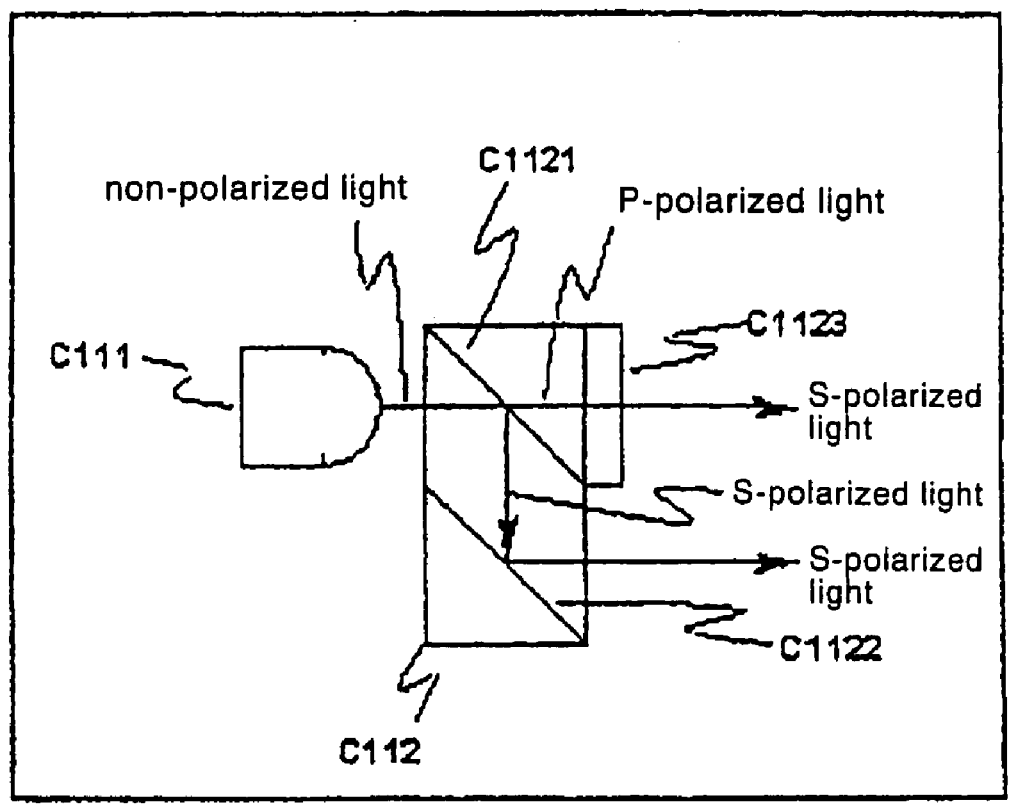
FIG. 2 is a structural view showing the optical configuration of the source of linearly polarized light that is shown in FIG. 1.
Figure 3:
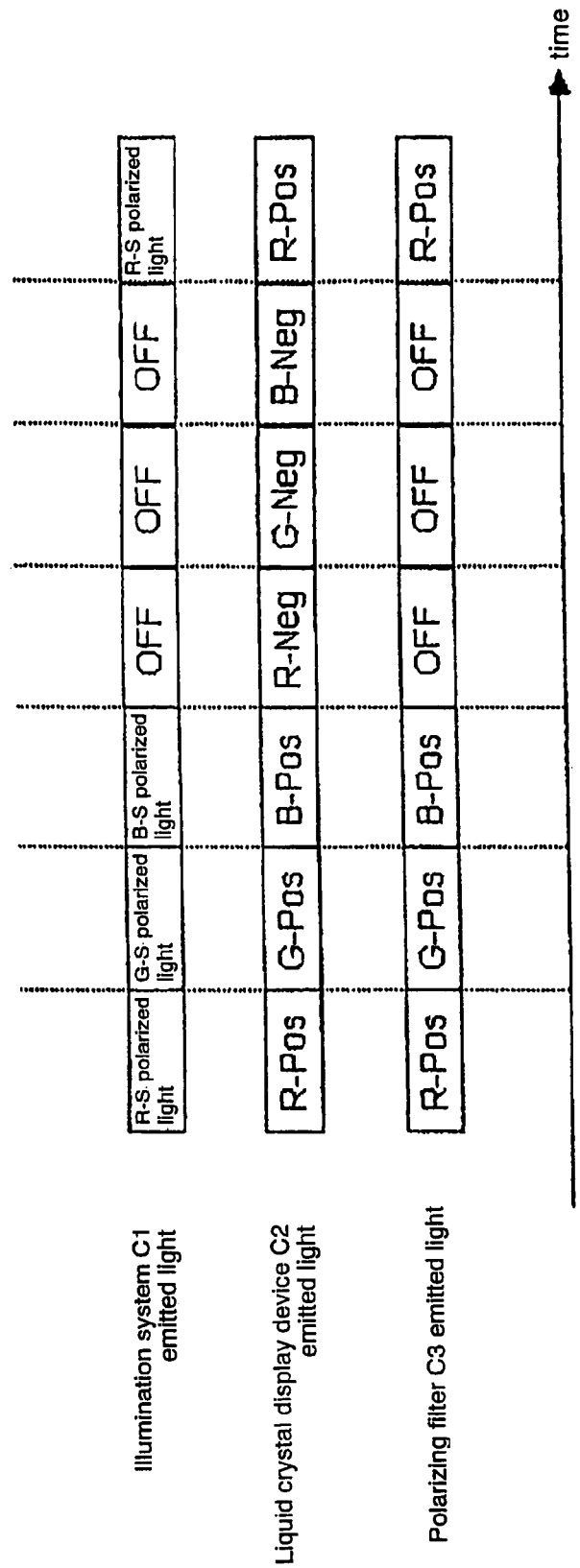
FIG. 3 is a timing chart showing the control states of the first example of the liquid crystal projector of the prior art that is shown in FIG. 1.
Figure 4:
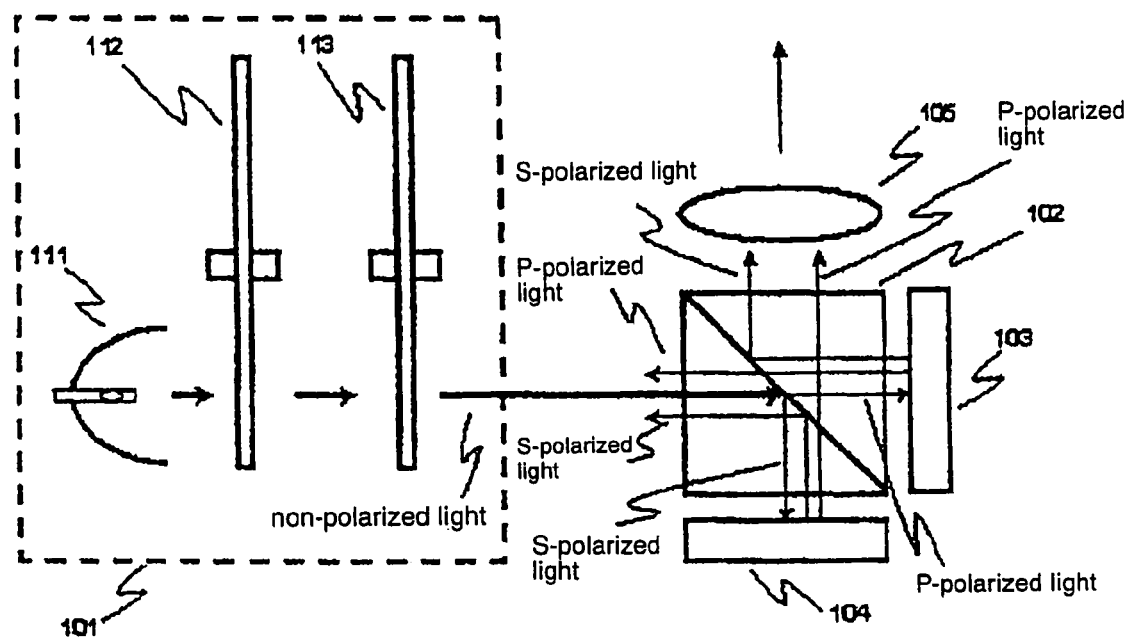
FIG. 4 is a structural view showing the optical configuration of the second example of a liquid crystal projector of the prior art.
Figure 5:
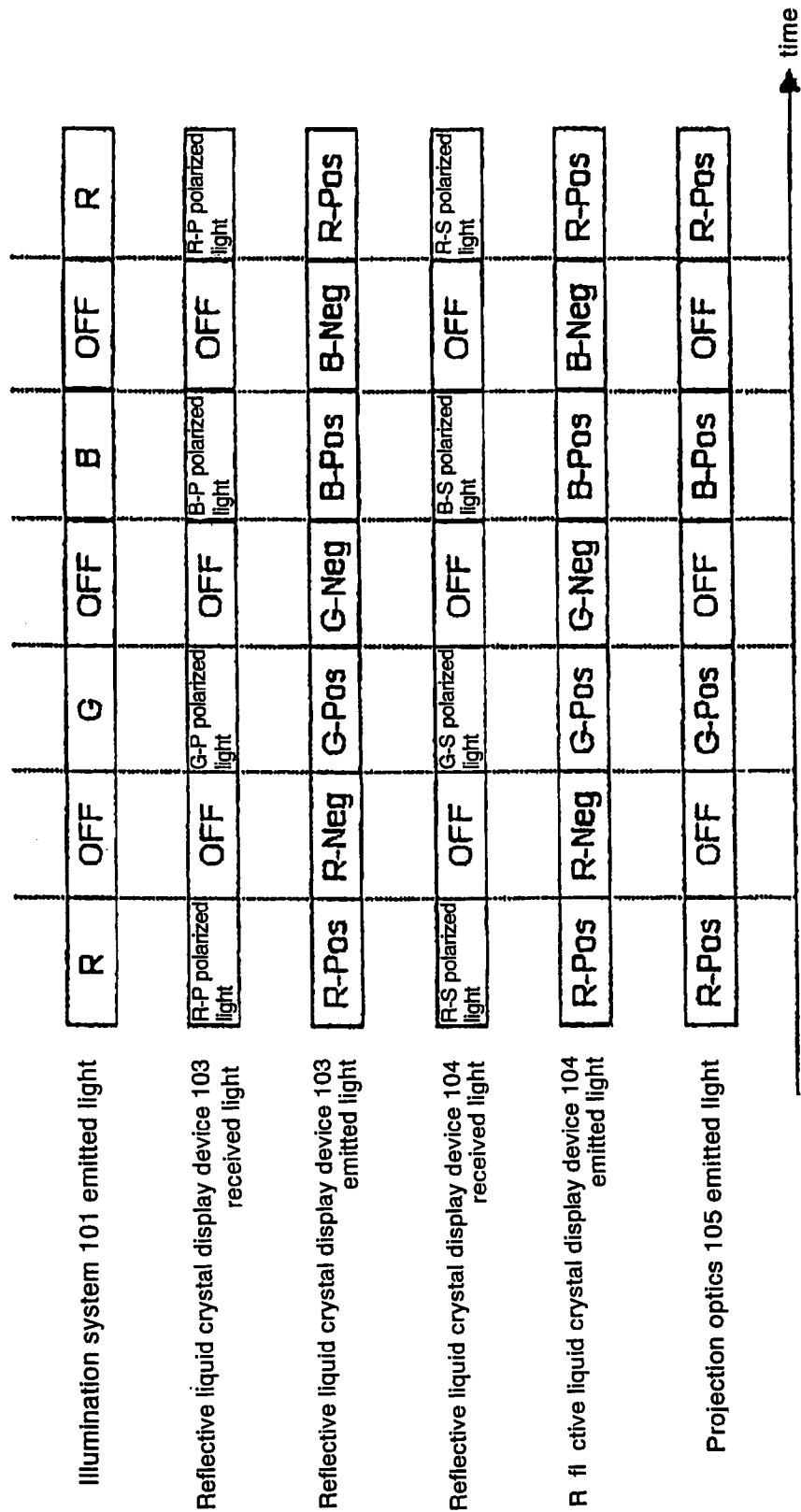
FIG. 5 is a timing chart showing the control states of the second example of the liquid crystal projector of the prior art that is shown in FIG. 4.
Figure 6:
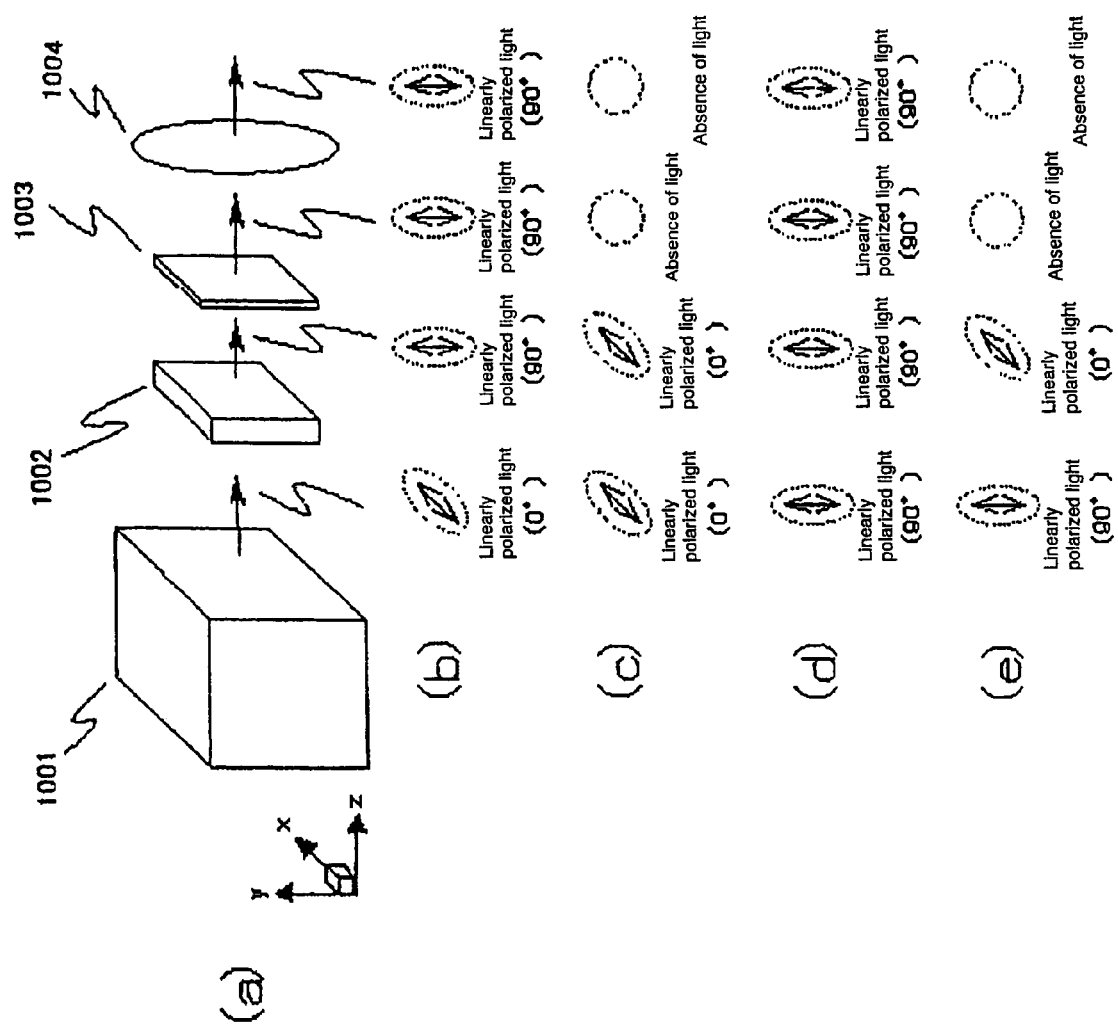
FIG. 6 is a structural view showing the optical configuration of the first embodiment of the liquid crystal projector of the present invention.

The first embodiment of the present invention is first described in detail with reference to the accompanying figures. FIG. 6 is a structural view showing the optical configuration of the first embodiment of the liquid crystal projector of the present invention. Referring now to FIG. 6, the optical configuration of the first embodiment of the liquid crystal projector of the present invention is explained. The first embodiment employs one liquid crystal display device.

In FIG. 6, FIG. 6(a) shows the optical configuration of the first embodiment of the liquid crystal projector of the present invention, and FIGS. 6(b) to (e) show states of polarization.

Illumination system 1001 alternately emits over time linearly polarized light beams having polarization directions that differ by 90 degrees. Details regarding illumination system 1001 are explained hereinbelow.

The polarization states of the linearly polarized light beams that are emitted from illumination system 1001 are modulated for each picture element by liquid crystal display device 1002, and specific polarization components are filtered by polarizing filter 1003 to produce image light.

The image light that is emitted from polarizing filter 1003 is projected onto a screen (not shown in the figure) by projection optics 1004.

Explanation next regards the polarization states. In FIG. 6, an orthogonal coordinate system defined by an x-axis, y-axis, and z-axis is considered in which the principal ray from illumination system 1001 to projection optics 1004 is parallel to the z-axis and in which the directions of polarization are represented by angles formed with respect to the x-axis on the x-y plane. The polarization directions of the two types of linearly polarized light that are emitted from illumination system 1001 form angles of 0 degrees and 90 degrees with respect to the x-axis on the x-y plane. Polarizing filter 1003 is arranged so as to prevent transmission of the polarization component that forms an angle of 0 degrees with respect to the x-axis.

A ferroelectric liquid crystal display device acts as a half-wave plate that can switch the angle of the optical axis of the liquid crystal for each picture element. The liquid crystals in a ferroelectric liquid crystal have two states, the state that is produced by the application of a positive electric field being here called the P state, and the state that is produced by the application of a negative state being called the N state. In the N state, the angle formed by the optical axis of a liquid crystal and the x-axis is 0 degrees (or 90 degrees), and in the P-state, the angle formed by the optical axis of a liquid crystal and the x-axis is 45 degrees. If the angle of change of the optical axis of a liquid crystal is not 45 degrees, an optical phase difference compensator can be used to adjust the angle to 45 degrees.

In the N state, when the polarization direction of the received linearly polarized light is 0 degrees or 90 degrees, the polarization direction of the received light is either parallel or perpendicular to the optical axis, and the linearly polarized light of 0 degrees or 90 degrees is therefore emitted without any change to the polarization direction. In the P state, when the polarization direction of received linearly polarized light is 0 degrees or 90 degrees, the polarization direction of the received light forms a 45 degrees angle with the optical axis, whereby the polarization direction is changed by 90 degrees and linearly polarized light is emitted with an angle of 90 degrees or 0 degrees, respectively.

FIG. 6(b) shows a case in which the polarization direction of received linearly polarized light is 0 degrees and the liquid crystal is in the P state. In this case, the polarization direction is changed to 90 degrees and the light is transmitted by polarizing filter 1003.

FIG. 6(c) shows a case in which the polarization direction of the received linearly polarized light is 0 degrees and the liquid crystal is in the N state. In this case, the polarization direction remains unchanged at 0 degrees and the light is not transmitted by polarizing filter 1003.

FIG. 6(d) shows a case in which the polarization direction of the received linearly polarized light is 90 degrees and the liquid crystal is in the N state. In this case, the polarization direction remains unchanged at 90 degrees and the light is transmitted by polarizing filter 1003.

FIG. 6(e) shows a case in which the polarization direction of the received linearly polarized light is 90 degrees and the liquid crystal is in the P state. In this case, the polarization direction is changed to 0 degrees and the light is not transmitted by polarizing filter 1003.

In other words, when the polarization direction of received linearly polarized light is 0 degrees, the P state displays a bright state and the N state displays a dark state. On the other hand, when the polarization direction of received linearly polarized light is 90 degrees, the P state displays a dark state and the N state displays a bright state.

Explanation next regards a case in which liquid crystal display device 1002 is a TN liquid crystal. In TN liquid crystal, the state in which an electric field is not applied is called the N state, and the state in which the maximum electric field is applied is called the P state. Here, the explanation for the previously described ferroelectric liquid crystal also applies, but the control method for gray-scale display differs for the two types of liquid crystal.

In the case of TN liquid crystal, the intermediate states between the P state and N state are controlled by the absolute value of the applied electric field, whereby the proportion of the quantity of light of the 90 degrees polarization component in the emitted light can be varied.

In the case of a ferroelectric liquid crystal, however, the control of gray-scale display is realized through the time proportion of the polarity of the applied electric field, i.e., through pulse width modulation. This then causes a change in the time proportion of the P state and N state, and in turn: a change in the time proportion of the 90 degrees polarization component in the emitted light of liquid crystal display device 1002, a change in the average value over time of the amount of light that is transmitted by polarizing filter 1003, and consequently, a change in the gray level.

Accordingly, if the polarization direction of the linearly polarized light that is emitted from illumination system 1001 is made 0 degrees when controlling liquid crystal display device 1002 to display a positive (normal gray-scale) image and the polarization direction of the linearly polarized light that is emitted from illumination system 1001 is made 90 degrees when controlling liquid crystal display device 1002 to display a negative (inverted gray scale) image, the projected image can be made a positive (normal gray scale) in either case.

Figure 7:
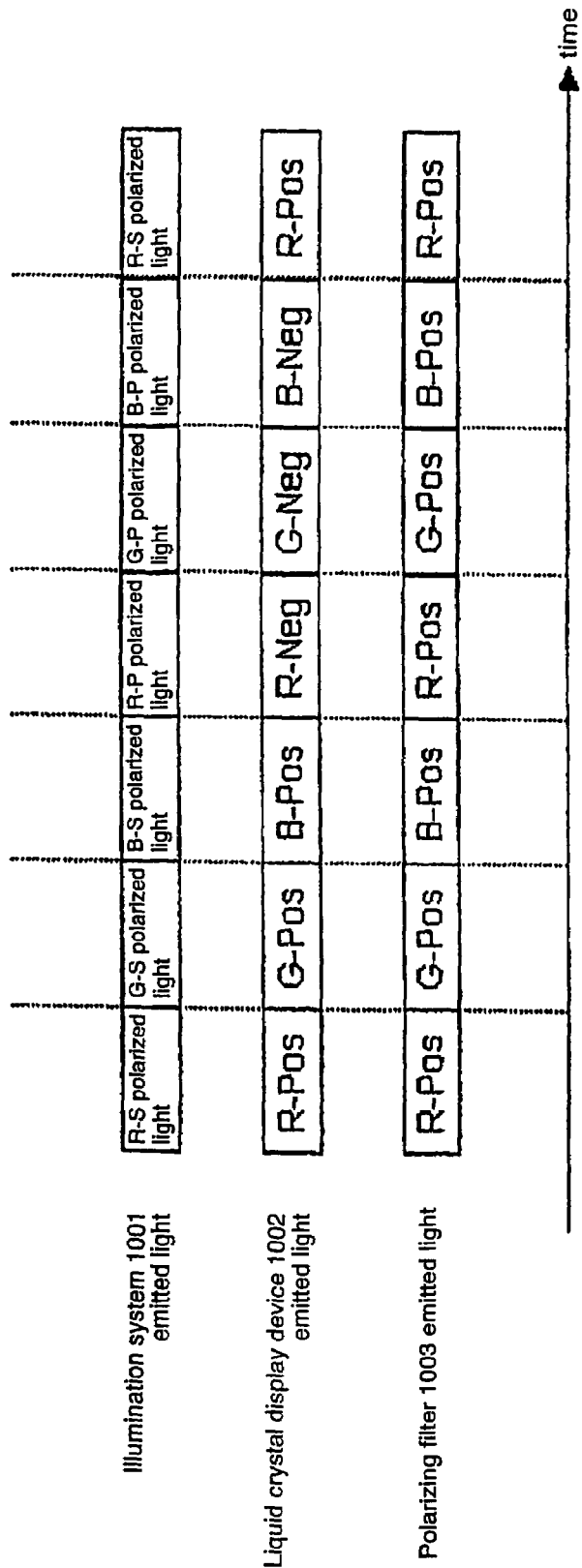
FIG. 7 is a timing chart showing the control states of the first embodiment of the liquid crystal projector of the present invention that is shown in FIG. 6.

Referring now to FIG. 7, explanation next regards the control of the first embodiment of the liquid crystal projector of the present invention that is shown in FIG. 6. FIG. 7 is a timing chart that shows the control states of the first embodiment of the liquid crystal projector of the present invention that is shown in FIG. 6.

In FIG. 7, R-P-polarized light indicates that the light is red P-polarized light, R-S-polarized light indicates that the light is red S-polarized light, G-P polarized light indicates that the light is green P-polarized light, G-S polarized light indicates that the light is green S-polarized light, B-P polarized light indicates that the light is blue P-polarized light, and B-S polarized light indicates that the light is blue S-polarized light.

In addition, R-Pos indicates the display of a positive red image, R-Neg indicates the display of a negative red image, G-Pos indicates the display of a positive green image, G-Neg indicates the display of a negative green image, B-Pos indicates the display of a positive blue image, and B-Neg indicates the display of a negative blue image. The polarization directions of the S-polarized light and the P-polarized light that are emitted from illumination system 1001 form angles of 0 degrees and 90 degrees, respectively, with respect to the x-axis in the x-y plane in FIG. 6.

Illumination system 1001 alternates in time between emitting an S-polarized light beam and a P-polarized light beam. Illumination system 1001 and liquid crystal display device 1002 are controlled in synchronization with video signals. During the intervals in which an S-polarized light beam (0 degrees) is emitted from illumination system 1001, liquid crystal display device 1002 is controlled so as to display a positive image in accordance with the video signals. As previously explained, the projected image at this time is a positive image.

During the intervals in which a p-polarized light beam (90 degrees) is emitted from illumination system 1001, liquid crystal display device 1002 is controlled so as to display a negative image in accordance with video signals. As previously explained, the projected image at this time is a positive image.

Accordingly, by implementing control such that liquid crystal display device 1002 alternately displays a positive image and a negative image, not only is the average electric field that is applied to the liquid crystal made zero and the burn-in phenomenon prevented, but at the same time, switching the polarization directions of the linearly polarized light that is emitted from illumination system 1001 enables the constant projection of a positive image.

In addition, illumination system 1001 successively emits red light, green light, and blue light, and in synchronization with this emission, liquid crystal display device 1002 successively displays a red image, a green image, and a blue image, whereby the projected image is perceived as a color image.

Figure 8:
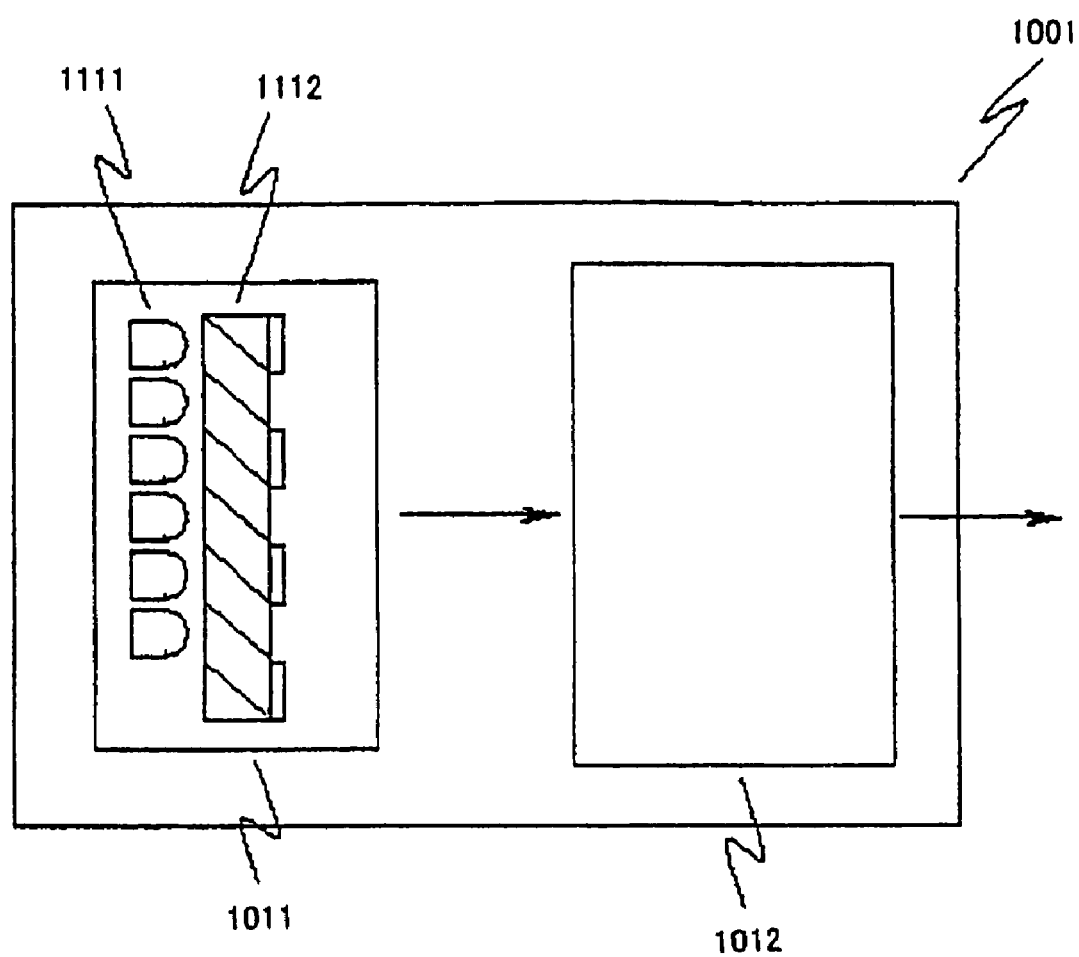
FIG. 8 is a structural view showing a first example of the optical configuration of the illumination system that is shown in FIG. 6.

The optical configuration of the illumination system in the first embodiment of the liquid crystal projector of the present invention is next described with reference to FIG. 8. FIG. 8 is a structural view showing a first example of the optical configuration of illumination system 1001 that is shown in FIG. 6.

Illumination system 1001 is composed of linearly polarized light source 1011 and luminous flux shaping optics 1012. Linearly polarized light source 1011 is made up from a light-emitting element array that is composed of a plurality of light-emitting elements 1111 and polarization conversion element array 1112. The plurality of light-emitting elements 1111 and polarization conversion element array 1112 can be arranged two-dimensionally. In addition, red, green, and blue light-emitting elements are used as the plurality of light-emitting elements 1111.

Linearly polarized light source 1011 alternates in time between emitting linearly polarized light beams (P-polarized light beams and S-polarized light beams) for which the polarization direction differs by 90 degrees. Details regarding the linearly polarized light source 1011 are described hereinbelow. The linearly polarized light that is emitted from linearly polarized light source 1011 is shaped by luminous flux shaping optics 1012 to a form suitable for illuminating liquid crystal display device 1002 of the succeeding stage.

In other words, luminous flux shaping optics 1012 performs the role of making the luminous flux that is irradiated upon liquid crystal display device 1002 the same size and shape as liquid crystal display device 1002 and equalizing the illuminance and color distribution.

Luminous flux shaping optics 1012 is composed of integrators or various types of lenses and are a known technology disclosed in, for example Japanese Patent Laid-Open Publication No. 2001-343706.

Figure 9A:
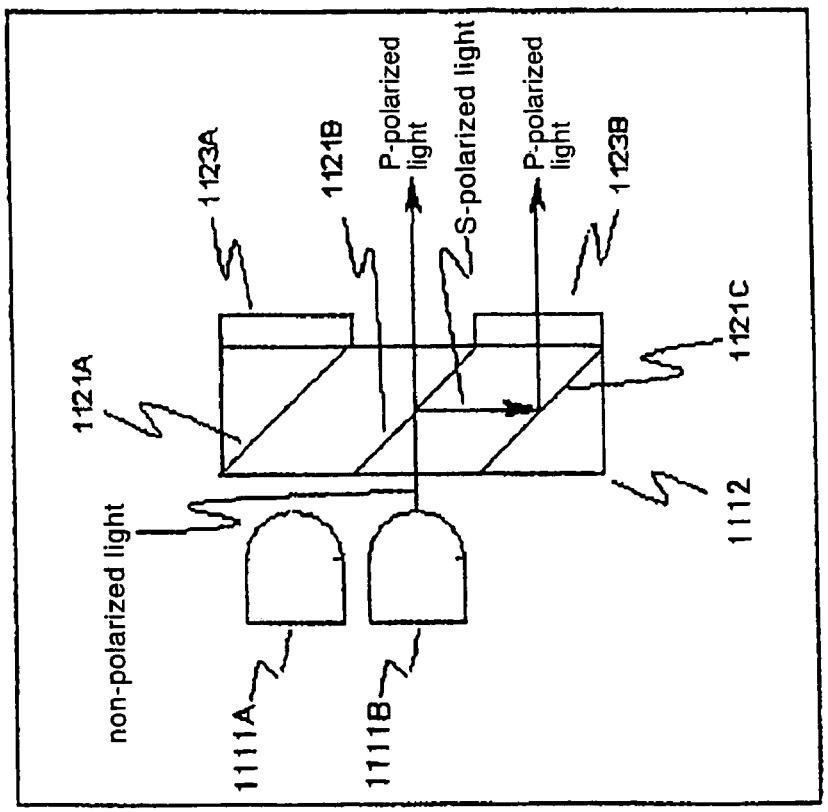
FIG. 9 is a structural view showing a first example of the optical configuration of the source of linearly polarized light that is shown in FIG. 8.

The optical configuration of the linearly polarized light source in the first embodiment of the present invention is next described with reference to FIG. 9. FIG. 9 is structural view showing a first example of the optical configuration of linearly polarized light source 1011 that is shown in FIG. 8. FIG. 9A is a view illustrating the emission of S-polarized light, and FIG. 9B is a view illustrating the emission of P-polarized light.

Referring first to FIG. 9A, the case of emission of S-polarized light is explained. The non-polarized light that is emitted from light-emitting element 1111A is separated into a P-polarized light beam and an S-polarized light beam by polarization beam splitter 1121A. The optical path of this S-polarized light beam is deflected by polarization beam splitter 1121B and then made parallel to the P-polarized light beam. The polarization direction of the P-polarized light beam that is emitted from polarization beam splitter 1121A undergoes a 90 degrees shift by half-wave plate 1123A and thus made identical to the polarization direction of the S-polarized light beam that is emitted from polarization beam splitter 1121A. In other words, the non-polarized light that is emitted from light-emitting element 1111A is converted to S-polarized light by polarization conversion element array 1112.

Figure 9B:
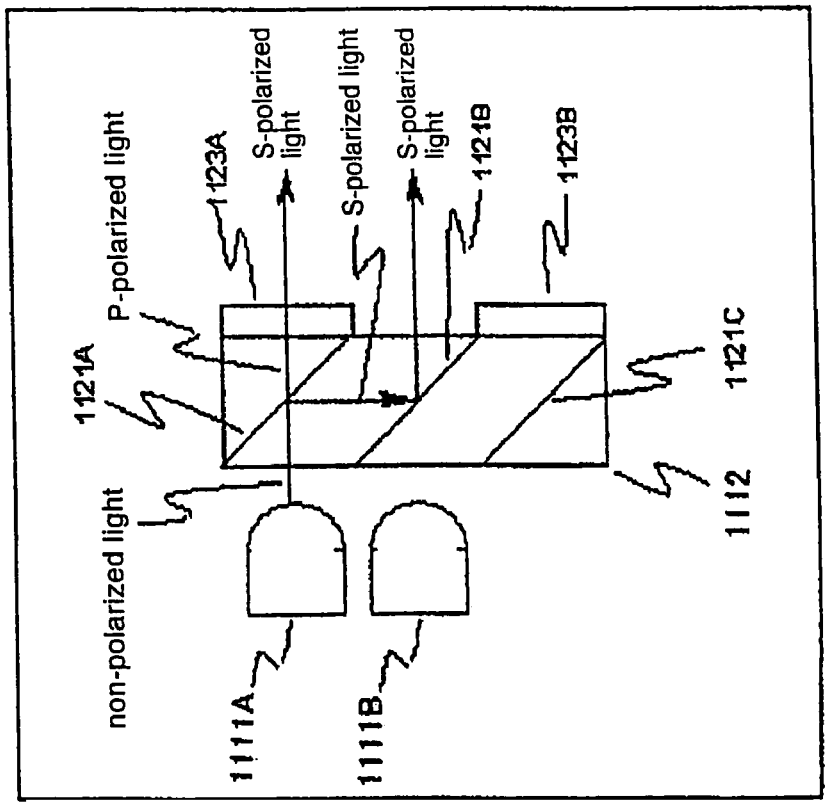

Next, referring to FIG. 9B, the case for the emission of P-polarized light is explained. Non-polarized light that is emitted by light-emitting element 1111B is separated by polarization beam splitter 1121B into a P-polarized light beam and an S-polarized light beam. The optical path of this S-polarized light beam is deflected by polarization beam splitter 1121C and then made parallel to the P-polarized light beam. The polarization direction of this S-polarized light beam is further subjected to a 90 degrees shift by half-wave plate 1123B and thus made identical to the polarization direction of the P-polarized light beam that is emitted from polarization beam splitter 1121B. In other words, the non-polarized light that is emitted from light-emitting element 1111B is converted by polarization conversion element array 1112 to P-polarized light.

By means of the above-described configuration, linearly polarized light source 1011 shown in FIG. 9 is capable of emitting S-polarized light from the emission of light-emitting element 1111A and is capable of emitting P-polarized light from the emission of light-emitting element 1111B.

Linearly polarized light source 1011 in FIG. 9 is the smallest unit for alternately emitting S-polarized light and P-polarized light, and the number of light-emitting elements can be increased. Taking the constituent elements that include light-emitting elements 1111A and 1111B, polarization beam splitters 1121A and 1121B, and half-wave plate 1123A as one block, a plurality of blocks are linked in a series that terminates in a block composed of polarization beam splitter 1121C and half-wave plate 1123B. Polarization beam splitter 1121C may be replaced by a mirror.

Light-emitting elements can thus be increased in one dimension. Light source blocks that are linked in one dimension in this way can be arranged in two dimensions to enable a further enlargement of linearly polarized light source 1011.

By means of the above-described construction, the average electric field that is applied to the liquid crystal in a liquid crystal projector that employs ferroelectric liquid crystal is made zero. As a result, not only can the burn-in phenomenon be prevented, but also, the projected image can be made brighter because the negative image that could not be displayed in the prior art can here be converted to a positive image and displayed.

Figure 10A:
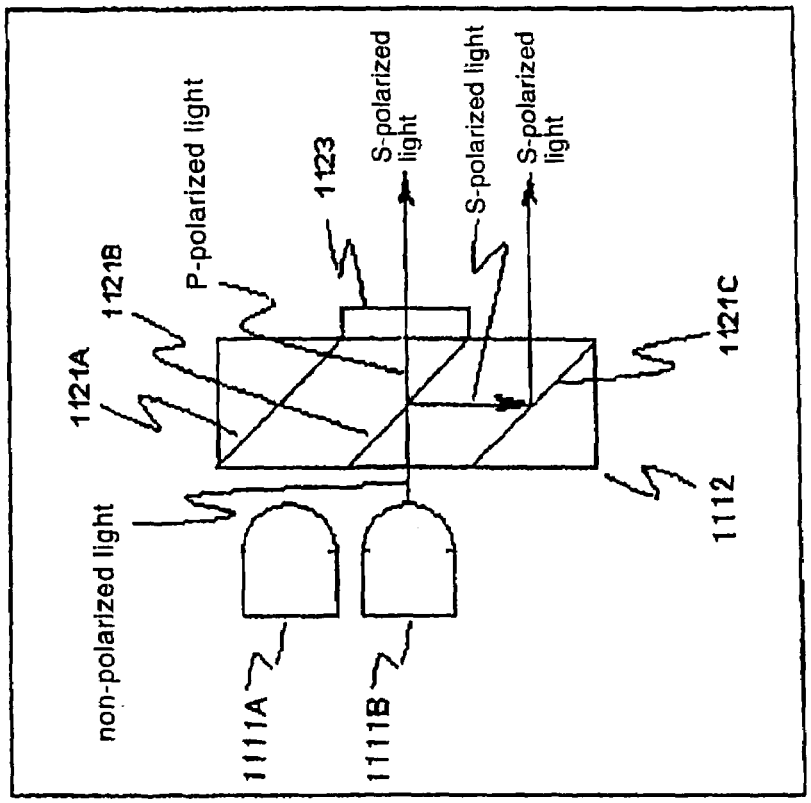
FIG. 10 is a structural view showing a second example of the optical configuration of the source of linearly polarized light that is shown in FIG. 8.

The second example of the linearly polarized light source in the first embodiment of the present invention is next explained with reference to FIG. 10. FIG. 10 is a structural view showing the second example of the optical configuration of linearly polarized light source 1011 that is shown in FIG. 8. FIG. 10A is a view for explaining the case of emitting P-polarized light, and FIG. 10B is a view for explaining the case of emitting S-polarized light.

Referring first to FIG. 10A, the case for emitting P-polarized light is explained. The non-polarized light that is emitted by light-emitting element 1111A is separated by polarization beam splitter 1121A into a P-polarized light beam and an S-polarized light beam. The optical path of this S-polarized light beam is deflected and then made parallel with the P-polarized light beam by means of polarization beam splitter 1121B. The polarization direction of this S-polarized light beam is further subjected to a 90 degrees shift by half-wave plate 1123 and thus made identical to the polarization direction of the P-polarized light that is emitted from polarization beam splitter 1121A. In other words, the non-polarized light that is emitted by light-emitting element 1111A is converted to P-polarized light by polarization conversion element array 1112.

Figure 10B:
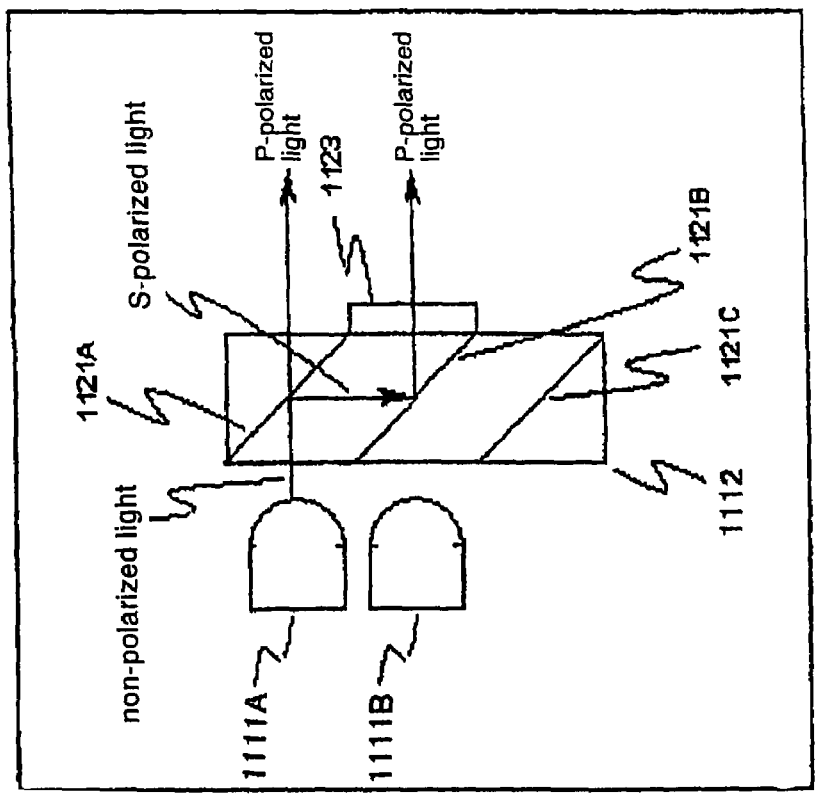

Referring next to FIG. 10B, the case for the emission of S-polarized light is explained. The non-polarized light that is emitted by light-emitting element 1111B is separated by polarization beam splitter 1121B into a P-polarized light beam and an S-polarized light beam. The optical path of this S-polarized light beam is deflected and then made parallel to the P-polarized light beam by polarization beam splitter 1121C. The polarization direction of the P-polarized light that is emitted from polarization beam splitter 1121B is further subjected to a shift of 90 degrees by half-wave plate 1123 and thus made identical to the polarization direction of the S-polarized light beam that is emitted from polarization beam splitter 1121B. In other words, the non-polarized light that is emitted from light-emitting element 1111B is converted to S-polarized light by polarization conversion element array 1112.

Based on the above-described configuration, linearly polarized light source 1011 that is shown in FIG. 10 is capable of emitting P-polarized light from the emission of light-emitting element 1111A and is capable of emitting S-polarized light from the emission of light-emitting element 1111B.

Linearly polarized light source 1011 in FIG. 10 illustrates the smallest unit for alternately emitting S-polarized light and P-polarized light, and the light-emitting elements can be increased. Taking the constituent elements that include light-emitting elements 1111A and 1111B, polarization beam splitters 1121A and 1121B, and half-wave plate 1123 as one block, a plurality of blocks are linked in a series, and this series is terminated in a block that is made up by polarization beam splitter 1121C. Polarization beam splitter 1121C may be replaced by a mirror.

Light-emitting elements can thus be increased in one dimension. Light source blocks that are linked in one dimension in this way can be arranged in two dimensions to enable a further enlargement of linearly polarized light source 1011.

Figure 11A:
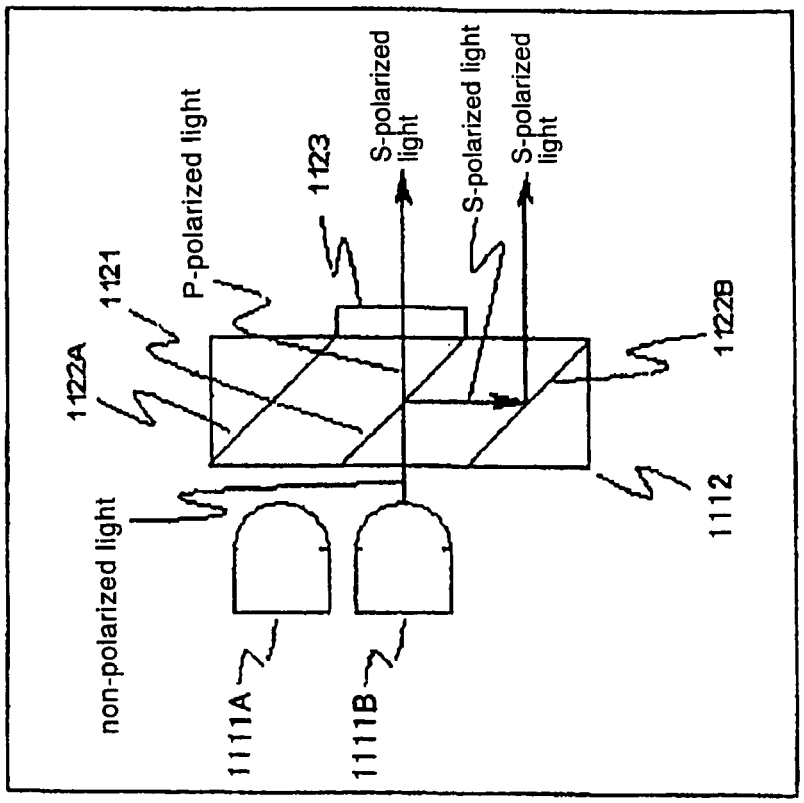
FIG. 11 is a structural view showing a third example of the optical configuration of the source of linearly polarized light that is shown in FIG. 8.
Figure 11B:
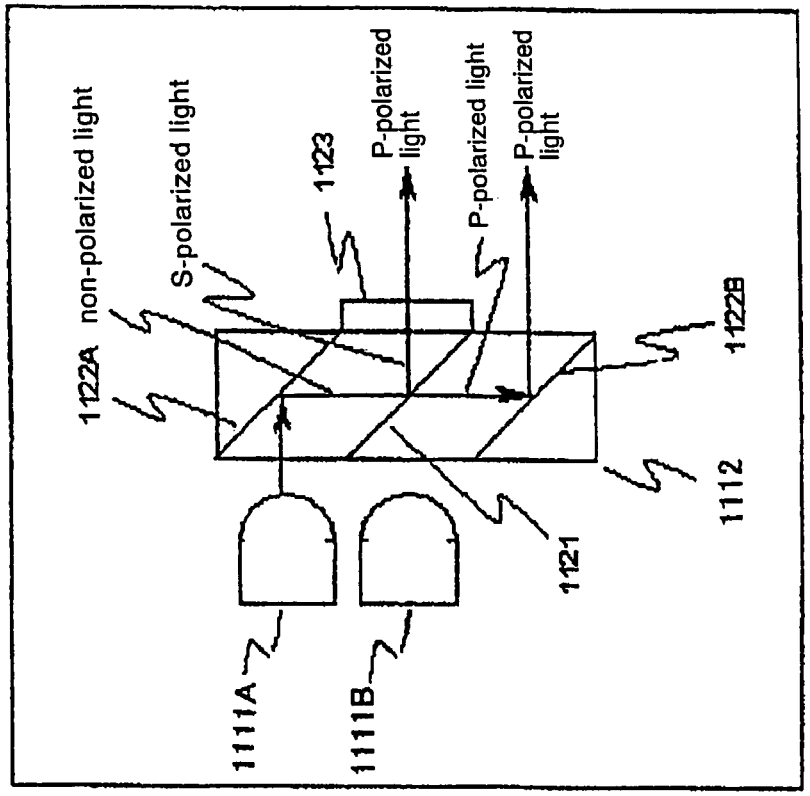

Referring now to FIG. 11, explanation next regards a third example of the linearly polarized light source in the first embodiment of the liquid crystal projector of the present invention. FIG. 11 is a structural view showing the third example of the optical configuration of linearly polarized light source 1011 that is shown in FIG. 8. FIG. 11A is a view for explaining the case for emitting P-polarized light, and FIG. 11B is a view for explaining the case for emitting S-polarized light.

Referring first to FIG. 11A, explanation first regards the emission of P-polarized light. The optical path of the non-polarized light that is emitted from light-emitting element 1111A is deflected by mirror 1122A, and then separated by polarization beam splitter 1121 into a P-polarized light beam and an S-polarized light beam. The optical path of this P-polarized light beam is deflected and made parallel to the S-polarized light beam by mirror 1122B. The polarization direction of the S-polarized light beam that is emitted from polarization beam splitter 1121 is subjected to a 90 degrees shift by half-wave plate 1123 and thus made identical to the polarization direction of the P-polarized light beam that is emitted from polarization beam splitter 1121. In other words, the non-polarized light that is emitted from light-emitting element 1111A is converted to P-polarized light by polarization conversion element array 1112.

Referring next to FIG. 11B, the case for emission of S-polarized light is explained. The non-polarized light that is emitted by light-emitting element 1111B is separated by polarization beam splitter 1121 into a P-polarized light beam and an S-polarized light beam. The optical path of this S-polarized light beam is deflected and made parallel with the P-polarized light beam by mirror 1122B. The polarization direction of the P-polarized light beam that is emitted from polarization beam splitter 1121 is subjected to a 90 degrees shift by half-wave plate 1123 and thus made identical to the polarization direction of the S-polarized light beam that is emitted from polarization beam splitter 1121. In other words, the non-polarized light that is emitted by light-emitting element 1111B is converted to S-polarized light by polarization conversion element array 1112.

Based on the above-described configuration, linearly polarized light source 1011 that is shown in FIG. 11 is capable of emitting P-polarized light by the emission of light-emitting element 1111A and capable of emitting S-polarized light by the emission of light-emitting element 1111B.

Linearly polarized light source 1011 in FIG. 11 is the smallest unit for alternately emitting S-polarized light and P-polarized light, and the number of light-emitting elements can be increased. Taking the constituent elements that include light-emitting elements 1111A and 1111B, polarization beam splitter 1121, mirror 1122A, and half-wave plate 1123 as one block, a plurality of blocks are linked in a series, and the series is terminated by the constituent element mirror 1122B. The light-emitting element can thus be increased in one dimension. Light source blocks that have been linked in one dimension in this way can be arranged in two dimensions to further enlarge linearly polarized light source 1011.

Figure 12:
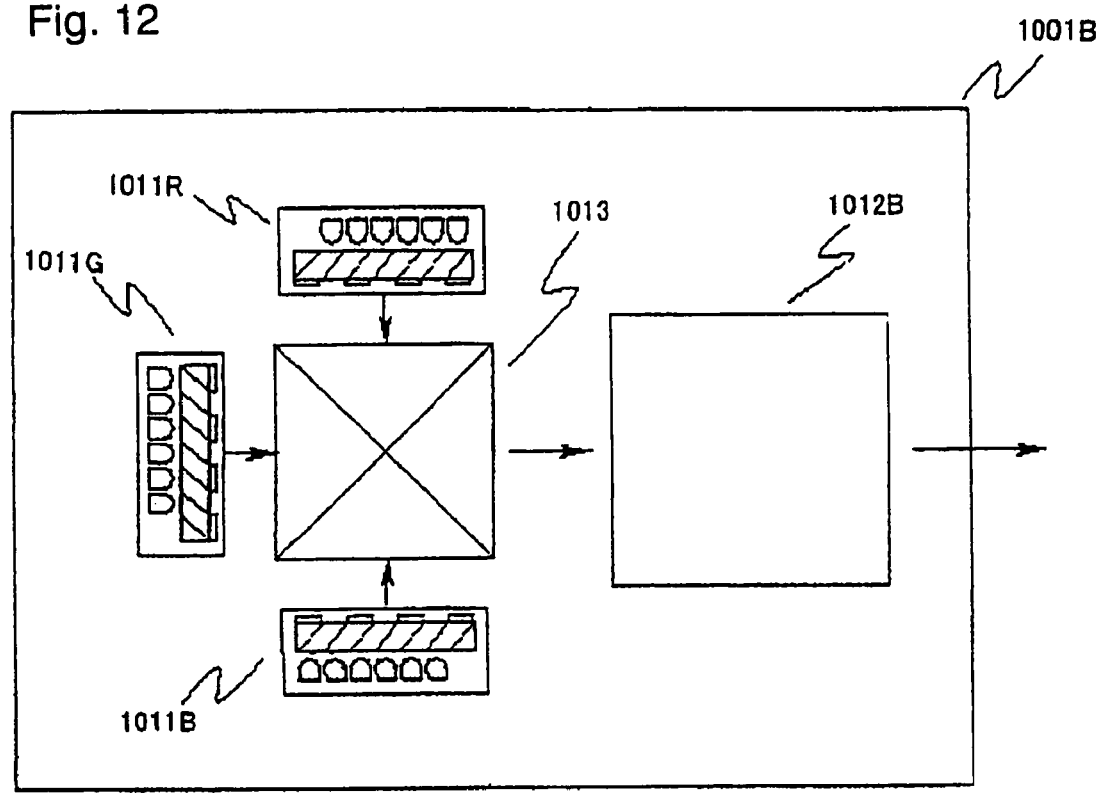
FIG. 12 is a structural view showing a second example of the optical configuration of the illumination system that is shown in FIG. 6.

The second example of the illumination system in the first embodiment of the liquid crystal projector of the present invention is next explained with reference to FIG. 12. FIG. 12 is a structural view showing a second example of the optical configuration of illumination system 1001 that is shown in FIG. 6.

As shown in FIG. 12, illumination system 1001B is made up by: linearly polarized light sources 1011R, 1011G, and 1011B; color synthesizing optics 1013, and luminous flux shaping optics 1012B.

Linearly polarized light sources 1011R, 1011G and 1011B are each made up by a plurality of light-emitting elements and polarization conversion element arrays and are each of the same construction as linearly polarized light source 1011 in the previously described FIG. 8. However, linearly polarized light sources 1011R, 1011G, and 1011B each employ red, green, and blue light-emitting elements, respectively.

Each of linearly polarized light sources 1011R, 1011G, and 1011B alternates in time between emitting linearly polarized light beams having polarization directions that differ by 90 degrees. Color synthesizing optics 1013 combines the optical paths of the red, green and blue light that are emitted from each of linearly polarized light sources 1011R, 1011G, and 1011B and directs the combined light beams into luminous flux shaping optics 1012B.

Luminous flux shaping optics 1012B shapes the received light beams into a form that is suitable for irradiating liquid crystal display device 1002 of the succeeding stage. Color synthesizing optics 1013 is a known technology that can be constituted by a dichroic prism or dichroic mirror. Luminous flux shaping optics 1012B is a known technology that can be constituted by integrators and various lenses.

Figure 13:
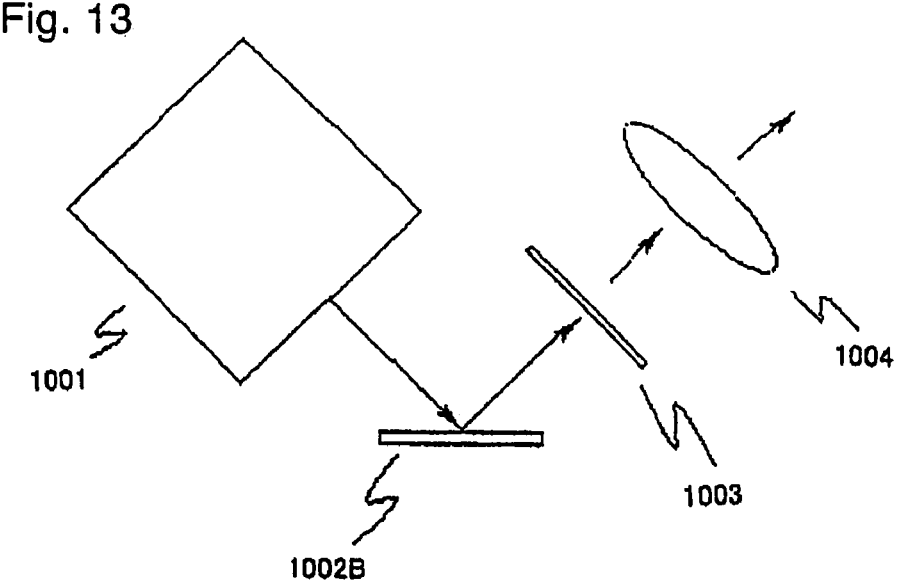
FIG. 13 is a structural view showing the optical configuration of another example of the first embodiment of the liquid crystal projector of the present invention.

Another example of the first embodiment of the liquid crystal projector of the present invention is next explained with reference to FIG. 13. FIG. 13 is a structural view showing the optical configuration of another example of the first embodiment of the liquid crystal projector of the present invention.

The example of the first embodiment of the liquid crystal projector of the present invention that is shown in FIG. 13 is made up by: illumination system 1001, liquid crystal display device 1002B, polarizing filter 1003, and projection optics 1004; the point of difference between this example and the first embodiment of the liquid crystal projector of the present invention that is shown in FIG. 6 being a difference in the liquid crystal display device, which is here identified as 1002B. The construction is otherwise identical, and the operation of the various constituent elements is the same as previously described.

Specifically, liquid crystal display device 1002 in the first embodiment of FIG. 6 is transmissive, while liquid crystal display device 1002B in this example of the first embodiment in FIG. 13 is reflective. In other words, the first embodiment of the present invention permits the use of either a transmissive or a reflective liquid crystal display device.

Although explanation has been presented in the above-described invention in which color is displayed by using one liquid crystal display device to successively project a red image, green image, and blue image, it should be obvious that the present invention can also be applied in a case in which three liquid crystal display devices are used and color is displayed by combining a red image, green image, and blue image by means of a dichroic mirror or dichroic prism.

Second Embodiment of the Present Invention

Figure 14:
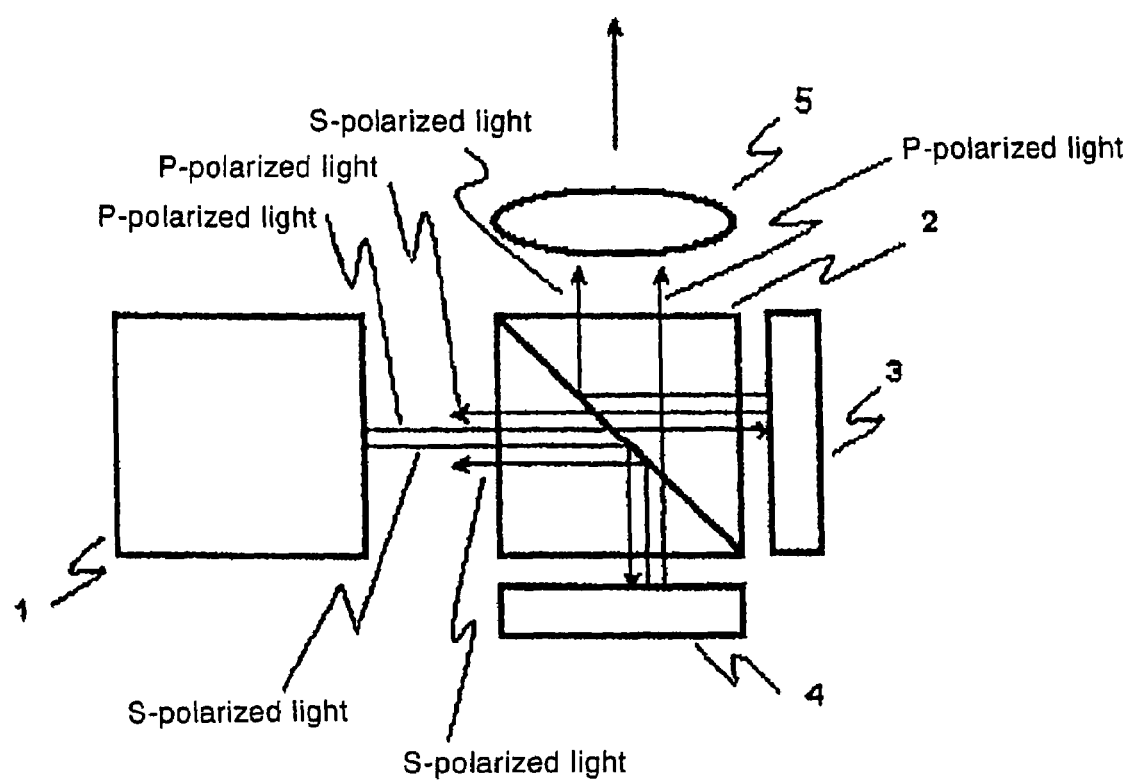
FIG. 14 is a structural view showing the optical configuration of the second embodiment of the liquid crystal projector of the present invention.

Explanation next regards the details of the second embodiment of the liquid crystal projector of the present invention. FIG. 14 is a structural view showing the optical configuration of the second embodiment of the liquid crystal projector of the present invention. The optical configuration of the second embodiment of the liquid crystal projector of the present invention is next explained with reference to FIG. 14.

Polarization beam splitter 2 is an optical element that allows the rectilinear propagation of P-polarized light while deflecting the optical path of S-polarized light 90 degrees. In the following explanation, P polarization and S polarization indicate the directions of oscillation of the linearly polarized light beams that become a P-polarized light beam and an S-polarized light beam in polarization beam-splitter 2.

Illumination means 1 (illumination system) alternates in time between emitting linearly polarized light beams (a P-polarized light beam and an S-polarized light beam), in which the directions of electric field oscillation differ by 90 degrees, and directs these light beams into polarization beam splitter 2. Details regarding illumination means 1 will be explained hereinbelow.

Reflective liquid crystal display device 3 receives a P-polarized light beam that has been transmitted by polarization beam splitter 2 and emits a P-polarized light beam and an S-polarized light beam in proportions that are controlled in accordance with video signals. Of the light that is emitted by reflective liquid crystal display device 3, the P-polarized light beam is propagated directly through polarization beam splitter 2 without being directed toward projection optics 5, and the S-polarized light beam is deflected by polarization beam splitter 2 and directed toward projection optics 5. In other words, reflective liquid crystal display device 3 modulates the P-polarized light beam and emits the S-polarized light beam as image light.

Reflective liquid crystal display device 4 receives the S-polarized light beam that has been transmitted by polarization beam splitter 2 and emits a P-polarized light beam and an S-polarized light beam in proportions that are controlled in accordance with video signals. Of the light that is emitted by reflective liquid crystal display device 4, the P-polarized light beam is propagated directly through polarization beam splitter 2 and is directed toward projection optics 5, and the S-polarized light beam is deflected by polarization beam splitter 2 and thus not directed toward projection optics 5. In other words, reflective liquid crystal display device 4 modulates the S-polarized light beam and emits a P-polarized light beam as image light.

Light that passes through polarization beam splitter 2 and reaches projection optics 5 is projected as image light onto a screen (not shown in the figure).

Figure 15:
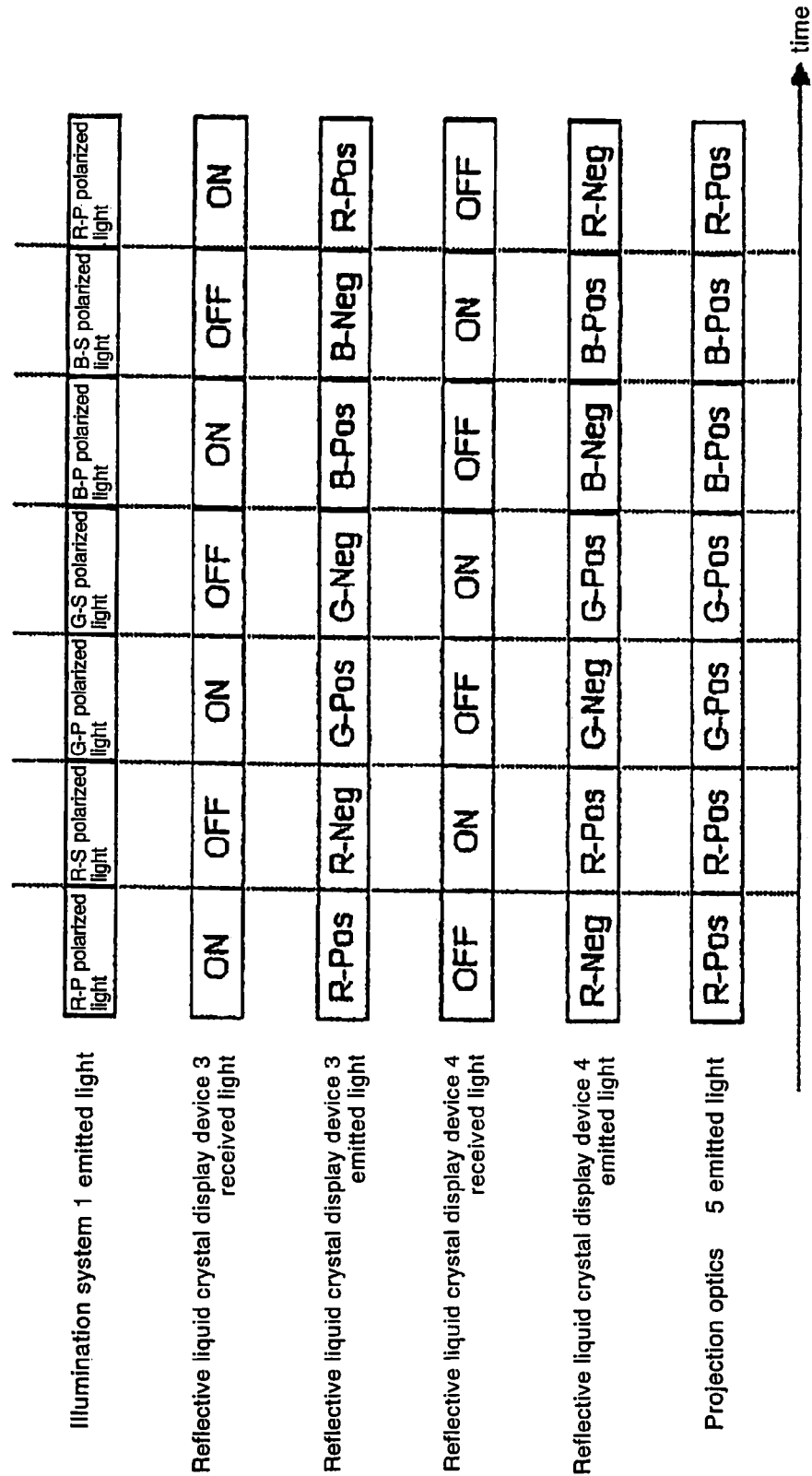
FIG. 15 is a timing chart showing the control states of the second embodiment of the liquid crystal projector of the present invention that is shown in FIG. 14.

Referring next to FIG. 15, explanation is presented regarding the control of the second embodiment of the liquid crystal projector that is shown in FIG. 14. FIG. 15 is a timing chart that shows the control states of the second embodiment of the liquid crystal projector of the present invention that is shown in FIG. 14.

In FIG. 15, R-P polarization indicates that the light is a red P-polarized light beam, R-S polarization indicates that the light is a red S-polarized light beam, G-P polarization indicates that the light is a green P-polarized light beam, G-S polarization indicates that the light is a green S-polarized light beam, B-P polarization indicates that the light is a blue P-polarized light beam, B-S polarization indicates that the light is a blue S-polarized light beam, ON indicates the presence of light, and OFF indicates the absence of light. In addition, R-Pos indicates the display of a positive red image, R-Neg indicates the display of a negative red image, G-Pos indicates the display of a positive green image, G-Neg indicates the display of a negative green image, B-Pos indicates the display of a positive blue image, and B-Neg indicates the display of a negative blue image.

Illumination means 1 alternates in time between emitting a P-polarized light beam and an S-polarized light beam. Illumination means 1 and reflective liquid crystal display devices 3 and 4 are controlled in synchronization with video signals.

Control is implemented such that during intervals in which a P-polarized light beam is emitted from illumination means 1, reflective liquid crystal display device 3 displays a positive image in accordance with the video signals and reflective liquid crystal display device 4 displays a negative image in accordance with the video signals.

Control is implemented such that during the intervals in which an S-polarized light beam is emitted from illumination means 1, reflective liquid crystal display device 3 displays a negative image in accordance with video signals, and reflective liquid crystal display device 4 displays a positive image in accordance with video signals.

Of the light from illumination means 1, only a P-polarized light beam is received in reflective liquid crystal display device 3 and only an S-polarized light beam is received in reflective liquid crystal display device 4.

Accordingly, projection optics 5 emits only the positive image light that is displayed by reflective liquid crystal display devices 3 and 4, and negative image light is not projected.

As a result of the above-described construction, the average electric field that is applied to the liquid crystal can be made zero and the uneven distribution of ions can thus be avoided, and as a result, the burn-in phenomenon can be prevented, and moreover, darkening of the image does not occur.

In addition, illumination means 1 successively emits red light, green light, and blue light, and in synchronization with this emission, reflective liquid crystal display devices 3 and 4 successively display a red image, green image, and blue image, whereby the projected image is perceived as a color image.

Figure 16:
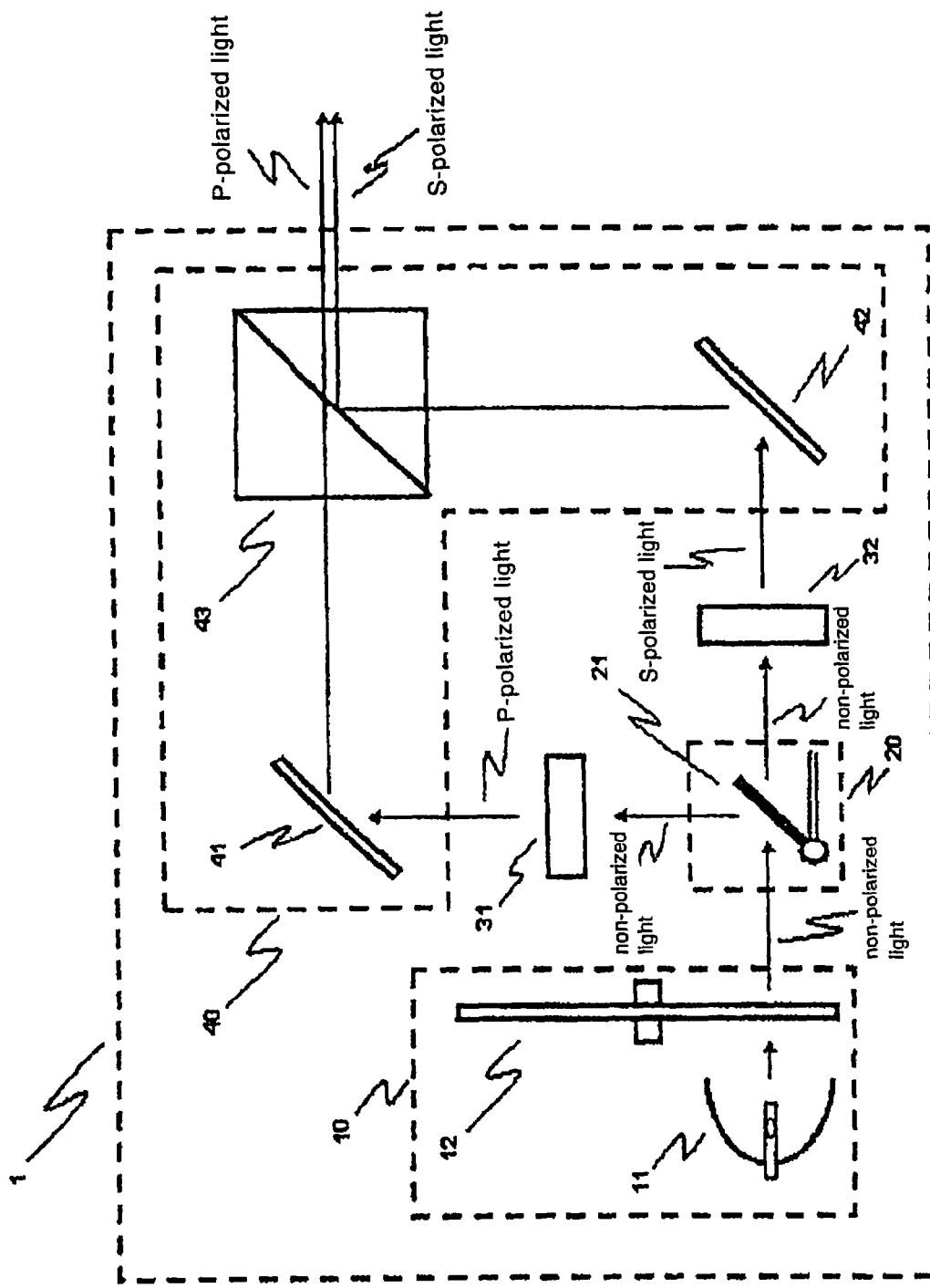
FIG. 16 is a structural view showing the optical configuration of the illumination means that is shown in FIG. 14.

FIG. 16 is a structural view showing the optical configuration of illumination means 1 that is shown in FIG. 14. Referring to FIG. 16, explanation is next presented regarding the optical configuration of illumination means 1 in the second embodiment of the present invention.

The direction of propagation of light that is emitted by light source 10 is switched by emitted optical path switching means 20 in the direction toward P-polarization unifying means 31 or in the direction toward S-polarization unifying means 32. The non-polarized light that is received in P-polarization unifying means 31 is arranged as a P-polarized light beam, and the non-polarized light that is received in S-polarization unifying means 32 is arranged as an S-polarized light beam.

Synthesizing optics 40 receives the P-polarized light beam from P-polarization unifying means 31 and the S-polarized light beam from S-polarization unifying means 32 and emits the P-polarized light beam and the S-polarized light beam on the same optical path. As P-polarization unifying means 31 and S-polarization unifying means 32, a device may be used that is disclosed in the illumination optics and projector display device that are the invention described in Japanese Patent Laid-Open Publication No. H6-289387.

Explanation next regards each of the constituent blocks in illumination means 1. Light source 10 includes white light source 11 and color switching means 12. The white light that is emitted by white light source 11 is successively converted to red light, green light, and blue light by color switching means 12. Color switching means 12 may be a construction that uses a color wheel.

Figure 17:
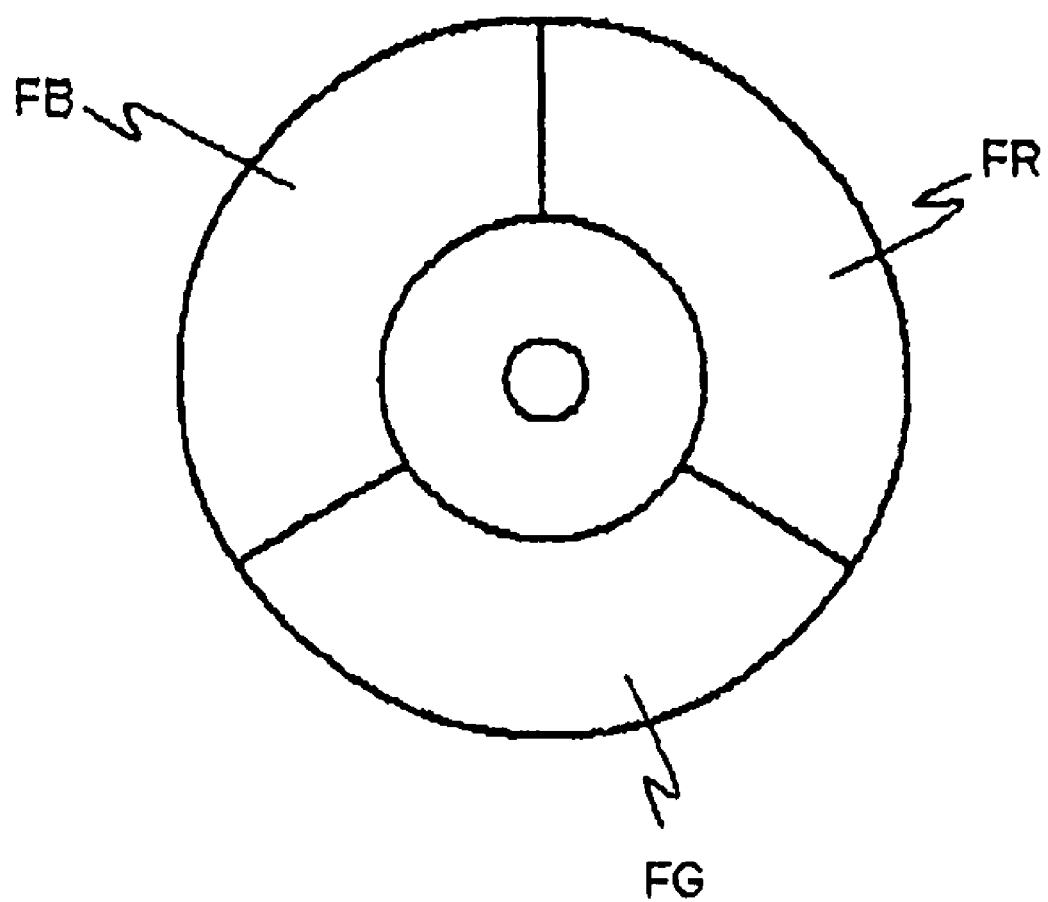
FIG. 17 is a structural view of the color wheel that is used in the color switching means that is shown in FIG. 16.

FIG. 17 is a structural view of a color wheel that is used in color switching means 12. In a color wheel, a disc having a plurality of regions (FR, FG, FB) having wavelength selectivity is rotated, whereby the regions that transmit the light are switched and the colors are switched.

The details of the construction of emitted optical path switching means 20 and synthesizing optics 40 are next explained with reference to FIG. 16. Emitted optical path switching means 20 can be constructed by tilting movable mirror 21 in which the angle of the mirror can be controlled.

Synthesizing optics 40 can be constructed by polarized beam combiner 43 and fixed mirrors 41 and 42. Polarized beam combiner 43 is an optical element that allows the rectilinear propagation of a P-polarized light beam but deflects the optical path of an S-polarized light beam by 90 degrees. Polarized beam combiner 43 receives the P-polarized light beam from P-polarization unifying means 31 by means of fixed mirror 41 and allows the rectilinear propagation of the P-polarized light beam, receives the S-polarized light beam from S-polarization unifying means 32 by means of fixed mirror 42 and deflects the optical path of the S-polarized light beam by 90 degrees, and emits P-polarized light beam and S-polarized light beam on the same optical path.

Figure 18:
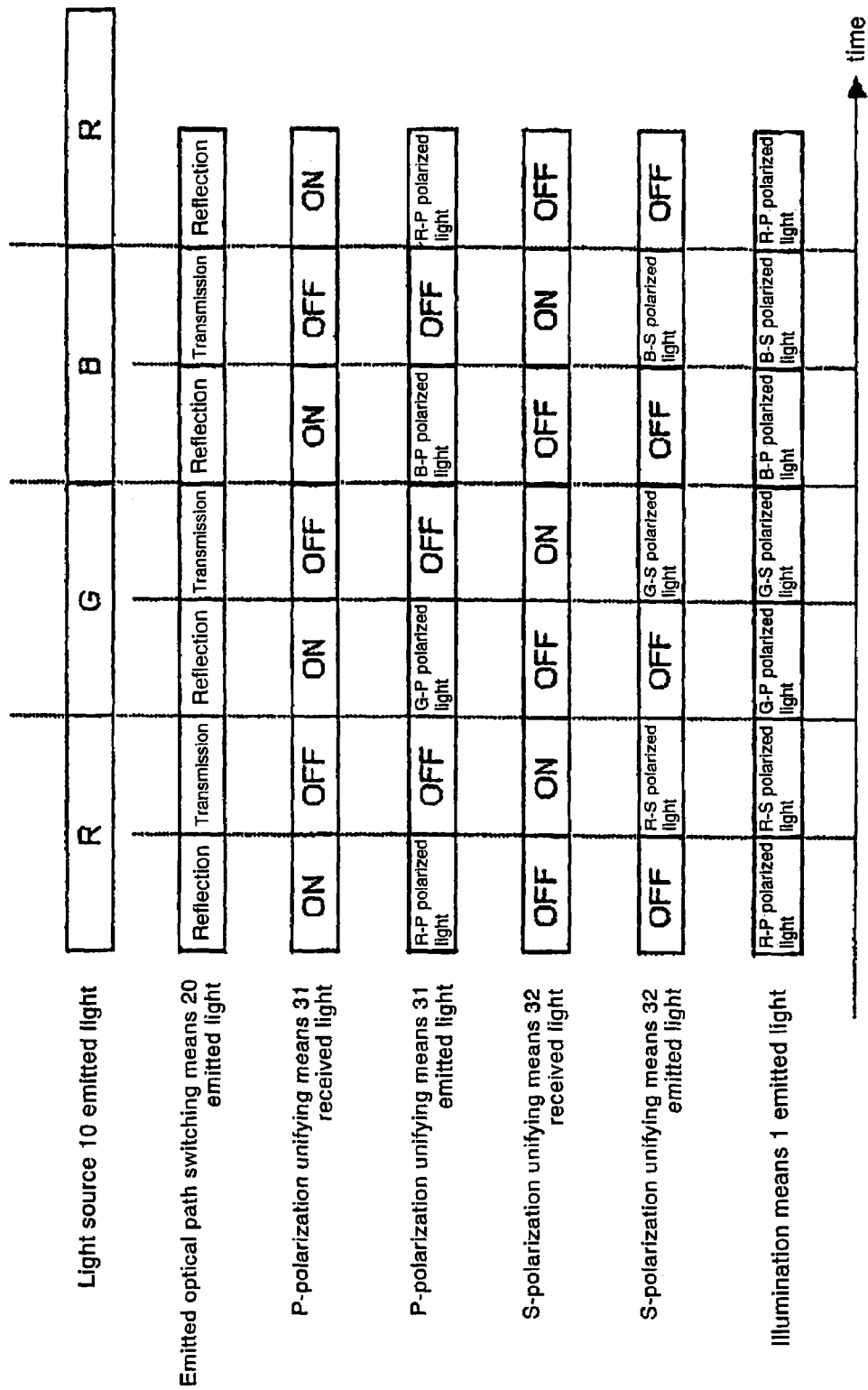
FIG. 18 is a timing chart showing the control states of the illumination means that is shown in FIG. 16.

FIG. 18 is a timing chart showing the control states of illumination means 1 that is shown in FIG. 16. The control of illumination means 1 that is shown in FIG. 16 is next explained with reference to FIG. 18.

In FIG. 18, R indicates that the light is red, G indicates that the light is green, B indicates that the light is blue, reflection indicates that the optical path is deflected by reflection, transmission indicates that the light is propagated rectilinearly, ON indicates that there is light, and OFF indicates that there is no light. In addition, R-P polarization indicates that the light is a red P-polarized light beam, R-S polarization indicates that the light is a red S-polarized light beam, G-P polarization indicates that the light is a green P-polarized light beam, G-S polarization indicates that the light is a green S-polarized light beam, B-P polarization indicates that the light is a blue P-polarized light beam, and B-S polarization indicates that the light is a blue S-polarized light beam.

Light source 10 successively emits red light, green light and blue light. Emitted optical path switching means 20 switches the optical path by either reflecting or transmitting the received light. Light source 10 and emitted optical path switching means 20 are controlled in synchronization with video signals.

P-polarization unifying means 31 receives light that has been reflected by emitted optical path switching means 20 and unifies this light as a P-polarized light beam. S-polarization unifying means 32 receives light that has been transmitted by emitted optical path switching means 20 and unifies the light as an S-polarized light beam. Light is alternately received at P-polarization unifying means 31 and S-polarization unifying means 32, and a P-polarized light beam and an S-polarized light beam are therefore alternately emitted from illumination means 1.

Figure 19:
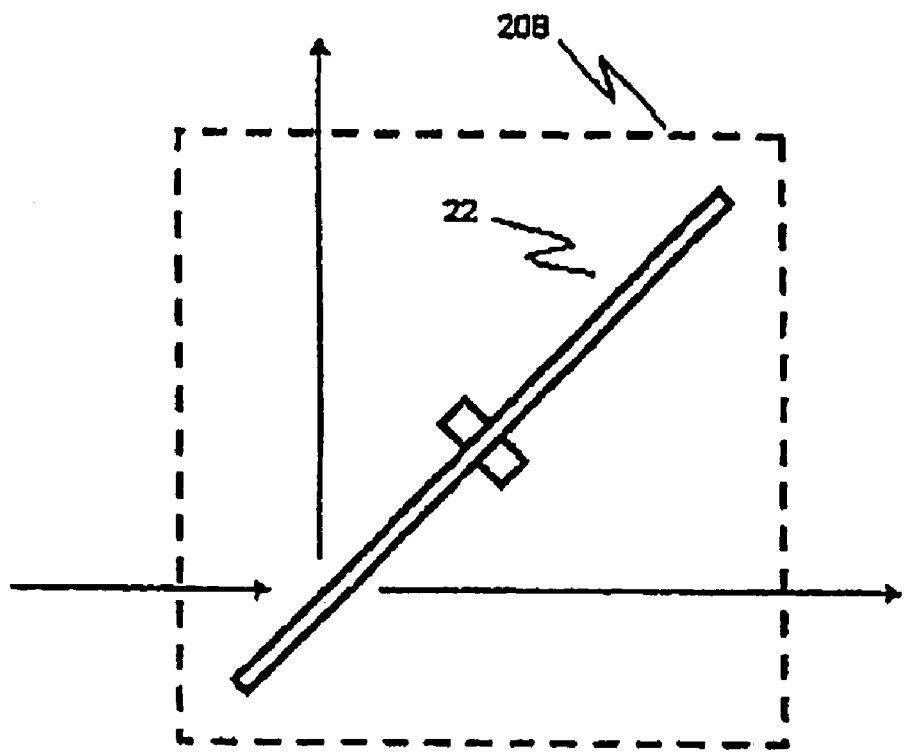
FIG. 19 is a structural view showing the optical configuration of the emitted optical path switching means that is different from the emitted optical path switching means that is shown in FIG. 16.

Another embodiment of the emitted optical path switching means is next explained with reference to the figures. FIG. 19 is a structural view showing the optical configuration of emitted optical path switching means 20B. Emitted optical path switching means 20 in FIG. 16 can be replaced by emitted optical path switching means 20B that is shown in FIG. 19.

Figure 20:
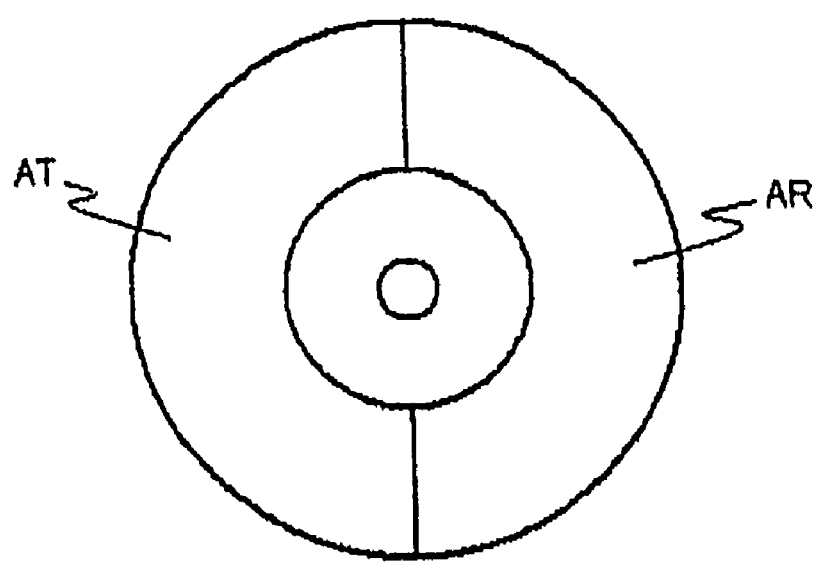
FIG. 20 is a structural view showing the construction of the rotating movable mirror that is used in the emitted optical path switching means that is shown in FIG. 19.

Emitted optical path switching means 20B can be constructed using rotating movable mirror 22. FIG. 20 is a structural view showing the construction of rotating movable mirror 22. In rotating movable mirror 22, a disk having region AT that transmits light and a region AR that reflects light is rotated, whereby the received light is either reflected or transmitted, thus switching the optical path.

Figure 21:
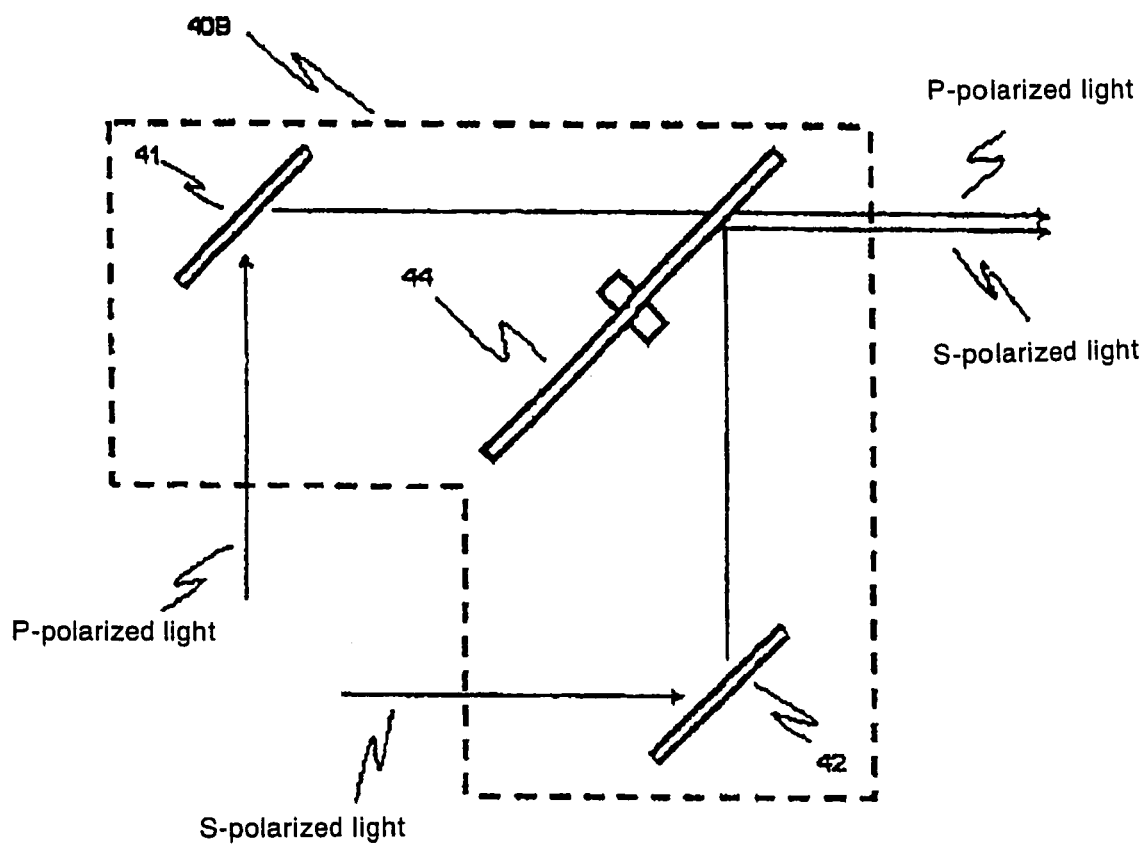
FIG. 21 is a structural view showing the optical configuration of the synthesizing optics that is different from the synthesizing optics shown in FIG. 16.

Referring next to the figures, another embodiment of the synthesizing optics is explained. FIG. 21 is a structural view showing the optical configuration of synthesizing optics 40B. Synthesizing optics 40 in FIG. 16 can be replaced by synthesizing optics 40B that is shown in FIG. 21.

Synthesizing optics 40B can be constructed from rotating movable mirror 44, and fixed mirrors 41 and 42. Rotating movable mirror 44 can be constructed using rotating movable mirror 22 shown in FIG. 20 that was used in previously described emitted optical path switching means 20B. In other words, rotating movable mirror 44 switches the received optical path by rotating a disk having region AT that transmits light and region AR that reflects light and unifies the optical path.

Figure 22:
FIG. 22 is a timing chart showing the control states of the illumination means that uses the synthesizing optics shown in FIG. 21.

Referring to the figures, explanation next regards the control of the illumination means that uses synthesizing optics 40B. FIG. 22 is a timing chart that shows the control states of the illumination means that uses synthesizing optics 40B that is shown in FIG. 21.

The symbols R, G, and B in FIG. 22 have the same meanings as the symbols used in previously described FIG. 18.

Light source 10 successively emits red light, green light, and blue light. Emitted optical path switching means 20 switches the optical path by either reflecting or transmitting the received light. Light source 10 and emitted optical path switching means 20 are controlled in synchronization with video signals.

P-polarization unifying means 31 receives light that has been reflected by emitted optical path switching means 20 and unifies this light as a P-polarized light beam. S-polarization unifying means 32 receives light that has been transmitted by emitted optical path switching means 20 and unifies this light as a S-polarized light beam.

Rotating movable mirror 44 of synthesizing optics 40B is controlled in synchronization with emitted optical path switching means 20, whereby rotating movable mirror 44 transmits light when emitted optical path switching means 20 reflects light, and rotating movable mirror 44 reflects light when emitted optical path switching means 20 transmits light.

Light is alternately received in P-polarization unifying means 31 and S-polarization unifying means 32, and P-polarized light beams and S-polarized light beams are therefore alternately emitted from illumination means 1.

As shown in FIG. 22, the timing of reflection and transmission in emitted optical path switching means 20 is the opposite of the timing in rotating movable mirror 44. Accordingly, rotating movable mirror 22 in emitted optical path switching means 20B can be unified with rotating movable mirror 44 in synthesizing optics 40B.

Figure 23:
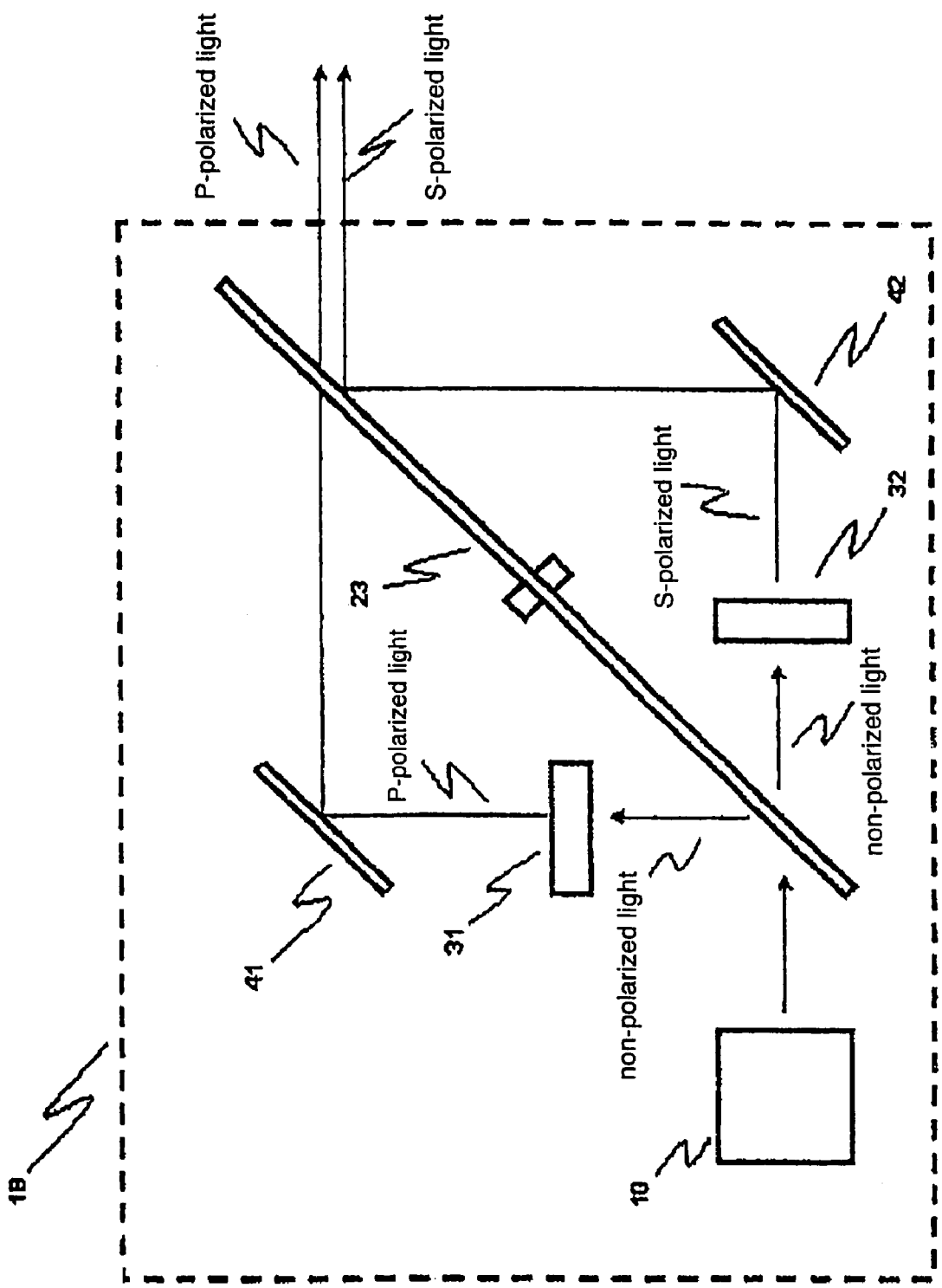
FIG. 23 is a structural view showing the optical configuration of illumination means that is different from the illumination means shown in FIG. 16.

Referring to the figures, explanation next regards another embodiment of the illumination means. FIG. 23 is a structural view showing the optical configuration of illumination means 1B. Illumination means 1 in FIG. 16 can be replaced by illumination means 1B shown in FIG. 23. Rotating movable mirror 23 can perform the roles of both rotating movable mirror 22 and rotating movable mirror 44, and the construction of rotating movable mirror 23 has the same construction as rotating movable mirror 22 that is shown in FIG. 20.

Although an example was described in the preceding explanation in which color was displayed by successively projecting a red image, green image, and blue image, it should be clear that the present invention can also be applied to a case in which color is displayed by using a dichroic mirror or dichroic prism to combine a red image, green image, and blue image.

As described hereinabove, the image light of an S-polarized light beam and the image light of a P-polarized light beam are alternately emitted in the liquid crystal projector according to the second embodiment of the present invention. Reflective liquid crystal display device 3 produces the image light of the S-polarized light beam, and reflective liquid crystal display device 4 produces the image light of the P-polarized light beam. Accordingly, a stereoscopic image can easily be displayed using the liquid crystal projector of the second embodiment of the present invention.

Explanation next regards the methods of displaying a stereoscopic image by the liquid crystal projector of the second embodiment of the present invention. Left-eye video signals and a right-eye video signals that take into account binocular parallax are applied as input to the liquid crystal projector of the second embodiment of the present invention, the left-eye image is produced by reflective liquid crystal display device 3, the right-eye image is produced by reflective liquid crystal display device 4, and these images are projected onto a screen. The images that are projected on this screen are viewed through polarization glasses in which the left-eye side is composed of a polarizing element that blocks the P-polarized light beam and the right-eye side is composed of a polarizing element that blocks the S-polarized light beam. Thus, the right-eye image of P-polarized light does not reach the left eye, and the left-eye image of S-polarized light does not reach the right eye, whereby three dimensions can be perceived due to binocular parallax.

Next, regarding another method of displaying a stereoscopic image, left-eye video signals and right-eye video signals that take into account binocular parallax are applied as input to the liquid crystal projector of the present invention, the left-eye image is produced in reflective liquid crystal display device 3, the right-eye image is produced in reflective liquid crystal display device 4, and the images are projected onto a screen.

These images that have been projected onto a screen are viewed through shutter glasses in which the right-eye view and the left-eye view are alternately blocked. By synchronizing the switching of the left- and right-eye images that are projected by the liquid crystal projector with the left- and right-eye shutters of the shutter glasses, the right-eye image can be prevented from reaching the left eye and the left-eye image can be prevented from reaching the right eye, whereby three dimensions are perceived due to binocular parallax. The shutter glasses used in this case may be of a liquid crystal shutter mode that control polarization or of a mechanical shutter mode that does not depend on polarization.

When the shutter type that does not depend on polarization is used, the polarization state has no bearing on the stereoscopic image display and a quarter-wave plate may therefore be inserted in the optical path following polarization beam splitter 2. The linearly polarized light therefore becomes circularly polarized light, thereby enabling a reduction of the influence of, for example, the polarization dependence of the screen and an improvement in the image quality.

Regarding the liquid crystal projector that is used for realizing stereoscopic image display as described above, the liquid crystal display device may be TN liquid crystal or ferroelectric liquid crystal.

In addition, in the first embodiment of the present invention, illumination means 1 or 1B that was described in the second embodiment of the present invention can be used in place of illumination system 1001 or 1001B.

Further, in the second embodiment of the present invention, illumination system 1001 or 1001B that was described in the first embodiment of the present invention can be used in place of illumination means 1 or 1B.

Finally, although the above-described embodiments are ideal embodiments of the present invention, the present invention is not limited to these embodiments, and the present invention is open to a variety of modifications within the scope of the invention.

While preferred embodiments of the present invention have been described using specific terms, such description is for illustrative purposes only, and it is to be understood that changes and variations may be made without departing from the spirit or scope of the following claims.

What is claimed is:

1. A liquid crystal projector, comprising:
    an illumination system having plural light emitting elements for alternately emitting in time a first linearly polarized light beam from a first one of said plural light emitting elements and a second linearly polarized light beam from a second one of said plural light emitting elements having directions of polarization that differ by 90 degrees;
    a liquid crystal display device for modulating light beams from said illumination system;
    a polarizing filter for filtering a specific polarization component of light beams from said liquid crystal display device; and
    projection optics for projecting light from said polarizing filter.

2. A liquid crystal projector, comprising:
    an illumination system having plural light emitting elements for alternately emitting in time a first linearly polarized light beam from a first one of said plural light emitting elements and a second linearly polarized light beam from a second one of said plural light emitting elements having directions of polarization that differ by 90 degrees;
    a polarization beam splitter for receiving said first linearly polarized light beam and said second linearly polarized light beam from said illumination system and splitting said beams in different directions;
    a first reflective liquid crystal display device for modulating said first linearly polarized light beam that has been split by said polarization beam splitter;
    a second reflective liquid crystal display device for modulating said second linearly polarized light beam that has been split by said polarization beam splitter; and
    projection optics;
    wherein said polarization beam splitter combines the light beam that has been modulated by said first reflective liquid crystal display device and the light beam that has been modulated by said second reflective liquid crystal display device; and
    said projection optics projects the light beams that have been combined by said polarization beam splitter.

3. A liquid crystal projector according to claim 1, wherein said liquid crystal display device is transmissive or reflective.

4. A liquid crystal projector according to claim 1, wherein said liquid crystal display device is constructed using a ferroelectric liquid crystal material.

5. A liquid crystal projector according to claim 2, wherein said first reflective liquid crystal display device and said second reflective liquid crystal display device are constructed using a ferroelectric liquid crystal material.

6. A liquid crystal projector according to claim 1, wherein said illumination system comprises:
    a light-emitting element array composed of said plurality of light-emitting elements, and
    a polarization conversion element array;
    wherein said polarization conversion element array receives the light that is generated from a portion of the light-emitting elements of said light-emitting element array and emits said first linearly polarized light beam, and receives the light that is generated from the remaining light-emitting elements of said light-emitting element array and emits said second linearly polarized light beam.

7. A liquid crystal projector according to claim 2, wherein said illumination system comprises:
    a light-emitting element array composed of said plurality of light-emitting elements, and
    a polarization conversion element array;
    wherein said polarization conversion element array receives the light that is generated from a portion of the light-emitting elements of said light-emitting element array and emits said first linearly polarized light beam, and receives the light that is generated from the remaining light-emitting elements of said light-emitting element array and emits said second linearly polarized light beam.

8. A liquid crystal projector according to claim 6, wherein said illumination system includes a plurality of combinations of said light-emitting element arrays and said polarization conversion element arrays.

9. A liquid crystal projector according to claim 7, wherein said illumination system includes a plurality of combinations of said light-emitting element arrays and said polarization conversion element arrays.

10. A liquid crystal projector according to claim 6, wherein one or a plurality of said light-emitting element arrays includes red light-emitting elements, green light-emitting elements, and blue light-emitting elements.

11. A liquid crystal projector according to claim 7, wherein one or a plurality of said light-emitting element arrays includes red light-emitting elements, green light-emitting elements, and blue light-emitting elements.

12. A liquid crystal projector according to claim 8, wherein one or a plurality of said light-emitting element arrays includes red light-emitting elements, green light-emitting elements, and blue light-emitting elements.

13. A liquid crystal projector according to claim 9, wherein one or a plurality of said light-emitting element arrays includes red light-emitting elements, green light-emitting elements, and blue light-emitting elements.

14. A liquid crystal projector according to claim 1, wherein said illumination system comprises:
    a light source;
    an emitted optical path switching means for alternately emitting light beams from said light source in two directions;
    a first polarization unifying means for converting light that is emitted in a first direction by said emitted optical path switching means to linearly polarized light;
    a second polarization unifying means for converting light that is emitted in a second direction by said emitted optical path switching means to linearly polarized light; and
    synthesizing optics for combining optical paths of the light from said first polarization unifying means and the light from said second polarization unifying means;
    wherein the direction of polarization of the polarized light that is emitted from said first polarization unifying means and the direction of polarization of the polarized light that is emitted from said second polarization unifying means forms an angle of 90 degrees.

15. A liquid crystal projector according to claim 2, wherein said illumination system comprises:
    a light source;
    an emitted optical path switching means for alternately emitting light beams from said light source in two directions;
    a first polarization unifying means for converting light that is emitted in a first direction by said emitted optical path switching means to linearly polarized light;

a second polarization unifying means for converting light that is emitted in a second direction by said emitted optical path switching means to linearly polarized light; and synthesizing optics for combining optical paths of the light from said first polarization unifying means and the light from said second polarization unifying means;

wherein the direction of polarization of the polarized light that is emitted from said first polarization unifying means and the direction of polarization of the polarized light that is emitted from said second polarization unifying means forms an angle of 90 degrees.

16. A liquid crystal projector according to claim 14, wherein said light source switches between emitting red light, green light, and blue light.

17. A liquid crystal projector according to claim 15, wherein said light source switches between emitting red light, green light, and blue light.

18. A liquid crystal projector according to claim 14, wherein said emitted optical path switching means includes a movable mirror for switching the direction in which received light is emitted.

19. A liquid crystal projector according to claim 15, wherein said emitted optical path switching means includes a movable mirror for switching the direction in which received light is emitted.

20. A liquid crystal projector according to claim 14, wherein said synthesizing optics includes a polarized light beam combiner for combining said first linearly polarized light beam and said second linearly polarized light beam.

21. A liquid crystal projector according to claim 15, wherein said synthesizing optics includes a polarized light beam combiner for combining said first linearly polarized light beam and said second linearly polarized light beam.

22. A liquid crystal projector according to claim 14, wherein said synthesizing optics includes a plurality of fixed mirrors and a movable mirror for switching received light.

23. A liquid crystal projector according to claim 15, wherein said synthesizing optics includes a plurality of fixed mirrors and a movable mirror for switching received light.

24. A liquid crystal projector according to claim 1, wherein said illumination system comprises:
a light source;
an emitted optical path switching means for alternately emitting light beams from said light source in two directions;
a first polarization unifying means for converting light that is emitted in a first direction by said emitted optical path switching means to linearly polarized light;
a second polarization unifying means for converting light that is emitted in a second direction by said emitted optical path switching means to linearly polarized light; and
synthesizing optics for combining optical paths of the light from said first polarization unifying means and the light from said second polarization unifying means;
wherein: said emitted optical path switching means includes a movable mirror for switching the direction in which received light is emitted;
said synthesizing optics includes a plurality of fixed mirrors and a movable mirror for switching received light;
a single movable mirror serves as both said movable mirror of said emitted optical path switching means and said movable mirror of said synthesizing optics; and
the direction of polarization of polarized light that is emitted from said first polarization unifying means and the direction of polarization of polarized light that is emitted from said second polarization unifying means form an angle of 90 degrees.

25. A liquid crystal projector according to claim 2, wherein said illumination system comprises:
a light source;
an emitted optical path switching means for alternately emitting light beams from said light source in two directions;
a first polarization unifying means for converting light that is emitted in a first direction by said emitted optical path switching means to linearly polarized light;
a second polarization unifying means for converting light that is emitted in a second direction by said emitted optical path switching means to linearly polarized light; and
synthesizing optics for combining optical paths of the light from said first polarization unifying means and the light from said second polarization unifying means;
wherein: said emitted optical path switching means includes a movable mirror for switching the direction in which received light is emitted;
said synthesizing optics includes a plurality of fixed mirrors and a movable mirror for switching received light;
a single movable mirror serves as both said movable mirror of said emitted optical path switching means and said movable mirror of said synthesizing optics; and
the direction of polarization of polarized light that is emitted from said first polarization unifying means and the direction of polarization of polarized light that is emitted from said second polarization unifying means form an angle of 90 degrees.

26. A liquid crystal projector according to claim 2, wherein said first reflective liquid crystal display device is controlled by left-eye video signals, and said second reflective liquid crystal display device is controlled by right-eye video signals.

27. A liquid crystal projector, comprising:
a polarization beam splitter for splitting received P-polarized light beam and S-polarized light beam in different directions;
an illumination means having plural light emitting elements for alternately directing in time a P-polarized light beam from a first one of said plural light emitting elements and an S-polarized light beam from a second one of said plural light emitting elements to said polarization beam splitter;
a first reflective liquid crystal display device for modulating a P-polarized light beam that has been split by said polarization beam splitter;
a second reflective liquid crystal display device for modulating an S-polarized light beam that has been split by said polarization beam splitter; and
projection optics;
wherein said polarization beam splitter combines the light beam that has been modulated by said first reflective liquid crystal display device and the light beam that has been modulated by said second reflective liquid crystal display device; and
said projection optics projects the light beams that have been combined by said polarization beam splitter.

28. A liquid crystal projector according to claim 27, wherein said first reflective liquid crystal display device and said second reflective liquid crystal display device are constructed using a ferroelectric liquid crystal material.

29. A liquid crystal projector according to claim 27, wherein said illumination means comprises:
- a light source;
- an emitted optical path switching means for alternately emitting in time light beams from said light source in two directions;
- a first polarization unifying means for converting light that has been emitted in a first direction by said emitted optical path switching means to linearly polarized light;
- a second polarization unifying means for converting light that is emitted in a second direction by said emitted optical path switching means to linearly polarized light; and
- synthesizing optics for combining optical paths of the light from said first polarization unifying means and the light from said second polarization unifying means;
- wherein a direction of oscillation of an electric field of polarized light that is emitted from said first polarization unifying means and a direction of oscillation of an electric field of polarized light that is emitted from said second polarization unifying means form an angle of 90 degrees.

30. A liquid crystal projector according to claim 29, wherein said emitted optical path switching means includes a movable mirror for switching the direction in which a received light is emitted.

31. A liquid crystal projector according to claim 29, wherein said synthesizing optics includes a polarized beam combiner for combining a P-polarized light beam and an S-polarized light beam.

32. A liquid crystal projector according to claim 29, wherein said synthesizing optics includes a plurality of fixed mirrors and a movable mirror for switching received light.

33. A liquid crystal projector according to claim 27, wherein:
- said first reflective liquid crystal display device and said second reflective liquid crystal display device are constructed using a ferroelectric liquid crystal material;
- said illumination means comprises:
- a light source;
- an emitted optical path switching means for alternately emitting light beams from said light source in two directions;
- a first polarization unifying means for converting light that is emitted in a first direction by said emitted optical path switching means to a linearly polarized light;
- a second polarization unifying means for converting light that is emitted in a second direction by said emitted optical path switching means to a linearly polarized light; and
- synthesizing optics for combining optical paths of the light from said first polarization unifying means and the light from said second polarization unifying means;
- wherein said emitted optical path switching means includes a movable mirror for switching the direction in which received light is emitted;
- said synthesizing optics includes a plurality of fixed mirrors and a movable mirror for switching received light;
- a single movable mirror serves as both said movable mirror of said emitted optical path switching means and said movable mirror of said synthesizing optics; and
- a direction of oscillation of an electric field of polarized light that is emitted from said first polarization unifying means and a direction of oscillation of an electric field of polarized light that is emitted from said second polarization unifying means forms an angle of 90 degrees.

34. A liquid crystal projector for displaying a stereoscopic image, said liquid crystal projector comprising:
- a polarization beam splitter for splitting received P-polarized light beam and S-polarized light beam in two different directions;
- an illumination means having plural light emitting elements for alternately directing in time a P-polarized light beam from a first one of said plural light emitting elements and an S-polarized light beam from a second one of said plural light emitting elements to said polarization beam splitter;
- a first reflective liquid crystal display device for modulating a P-polarized light beam that has been split by said polarization beam splitter;
- a second reflective liquid crystal display device for modulating an S-polarized light beam that has been split by said polarization beam splitter; and
- projection optics;
- wherein said illumination means comprises:
- a light source;
- an emitted optical path switching means for alternately emitting in time light beams from said light source in two directions;
- a first polarization unifying means for converting light that is emitted in a first direction by said emitted optical path switching means to linearly polarized light;
- a second polarization unifying means for converting light that is emitted in a second direction by said emitted optical path switching means to linearly polarized light; and
- synthesizing optics for combining optical paths of the light from said first polarization unifying means and the light from said second polarization unifying means;
- wherein:
- a direction of oscillation of an electric field of polarized light that is emitted from said first polarization unifying means and a direction of oscillation of an electric field of polarized light that is emitted from said second polarization unifying means form an angle of 90 degrees;
- said polarization beam splitter combines the light beam that has been modulated by said first reflective liquid crystal display device and the light beam that has been modulated by said second reflective liquid crystal display device;
- said projection optics is a liquid crystal projector that projects the light beams that have been combined by said polarization beam splitter;
- and wherein:
- said first reflective liquid crystal display device and said second reflective liquid crystal display device alternately produce a left-eye image and a right-eye image, respectively, and said liquid crystal projector projects these images onto a screen; and
- the images that are projected onto a screen are viewed through polarization glasses in which a left-eye polarizing element and a right-eye polarizing element have different directions of polarization.

35. A liquid crystal projector for displaying a stereoscopic image according to claim 34, wherein the images that are projected on said screen are viewed through shutter glasses wherein a switching of the left- and right-eye images that are projected by said liquid crystal projector is synchronized with left- and right-eye shutters of said shutter glasses.

* * * * *